United States Patent
Armstrong et al.

(10) Patent No.: US 12,362,439 B2
(45) Date of Patent: *Jul. 15, 2025

(54) ELECTRODE ASSEMBLIES INCLUDING CURRENT LIMITERS

(71) Applicant: Enovix Corporation, Fremont, CA (US)

(72) Inventors: Michael J. Armstrong, New Braunfels, CA (US); Daniel J. Noelle, Mountain View, CA (US); Robert S. Busacca, San Francisco, CA (US); Bruno A. Valdes, Sunnyvale, CA (US); Robert K. Rosen, Lincoln, CA (US); Murali Ramasubramanian, Fremont, CA (US); Ashok Lahiri, Cupertino, CA (US); Robert M. Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/316,321

(22) Filed: May 12, 2023

(65) Prior Publication Data

US 2023/0344092 A1 Oct. 26, 2023

Related U.S. Application Data

(63) Continuation of application No. 17/657,391, filed on Mar. 31, 2022, now Pat. No. 11,682,812, which is a
(Continued)

(51) Int. Cl.
*H01M 50/533* (2021.01)
*H01M 10/0525* (2010.01)
(Continued)

(52) U.S. Cl.
CPC ..... *H01M 50/533* (2021.01); *H01M 10/0525* (2013.01); *H01M 10/0585* (2013.01);
(Continued)

(58) Field of Classification Search
None
See application file for complete search history.

(56) References Cited

U.S. PATENT DOCUMENTS 8,305,725 B2 11/2012 Ooi et al.
8,580,424 B2 11/2013 Kim et al.
(Continued)

FOREIGN PATENT DOCUMENTS

CN 105244458 A 1/2016
CN 106849218 A 6/2017
(Continued)

OTHER PUBLICATIONS

Extended European Search Report issued for Application No. 21208850.4 on Apr. 20, 2022 (8 pages).
(Continued)

*Primary Examiner* — Robert S Carrico
(74) *Attorney, Agent, or Firm* — Haley Guiliano LLP; Ronit Buller

(57) ABSTRACT

A method includes stacking unit cells in a stacking direction. Each unit cell includes an electrode structure, a separator structure, and a counter-electrode structure. The electrode structure includes an electrode current collector and an electrode active material layer, and the counter-electrode structure includes a counter-electrode current collector and a counter-electrode active material layer. The electrode and counter-electrode structures extend in a longitudinal direction perpendicular to the stacking direction, and an end portion of the electrode current collector extends past the electrode active material and the separator structure in the
(Continued)

longitudinal direction. The end portion of each electrode current collector is bent in a direction orthogonal to the longitudinal direction, an electrode busbar is positioned extending in the stacking direction with a surface adjacent the end portions, and heat and pressure are applied to the electrode busbar to adhere the end portions to the busbar through an adhesive layer.

29 Claims, 17 Drawing Sheets

Related U.S. Application Data continuation of application No. PCT/US2022/021440, filed on Mar. 22, 2022.

(60) Provisional application No. 63/168,430, filed on Mar. 31, 2021, provisional application No. 63/202,922, filed on Jun. 30, 2021.

(51) Int. Cl.

| | |
|---|---|
| *H01M 10/0585* | (2010.01) |
| *H01M 50/531* | (2021.01) |
| *H01M 50/536* | (2021.01) |
| *H01M 50/54* | (2021.01) |
| *H01M 50/572* | (2021.01) |
| *H01M 50/581* | (2021.01) |
| *H01M 50/583* | (2021.01) |

(52) U.S. Cl.
CPC ....... *H01M 50/531* (2021.01); *H01M 50/536* (2021.01); *H01M 50/54* (2021.01); *H01M 50/572* (2021.01); *H01M 50/581* (2021.01); *H01M 50/583* (2021.01)

(56) References Cited

U.S. PATENT DOCUMENTS

| | | | |
|---|---|---|---|
| 8,582,269 | B2 | 11/2013 | Baek |
| 8,649,140 | B2 | 2/2014 | Peterson et al. |
| 9,166,230 | B1 | 10/2015 | Lahiri et al. |
| 9,660,292 | B2 | 5/2017 | Rust, III et al. |
| 10,734,633 | B2 | 8/2020 | Fan |
| 11,121,438 | B2 | 9/2021 | Fan et al. |
| 11,682,812 | B2 | 6/2023 | Armstrong et al. |
| 2007/0241856 | A1 | 10/2007 | Ohtsuka et al. |
| 2009/0117269 | A1 | 5/2009 | Hansen et al. |
| 2012/0034502 | A1 | 2/2012 | Nieh et al. |
| 2014/0216644 | A1 | 8/2014 | Keite-Telgenbuscher |
| 2016/0149196 | A1 | 5/2016 | Fan et al. |
| 2016/0268630 | A1* | 9/2016 | Tsukada ............ H01M 10/0562 |
| 2017/0104681 | A1 | 4/2017 | Azgin et al. |
| 2017/0365840 | A1 | 12/2017 | Fan et al. |
| 2019/0207264 | A1 | 7/2019 | Busacca et al. |
| 2020/0212493 | A1 | 7/2020 | Busacca et al. |
| 2021/0265617 | A1 | 8/2021 | Okano et al. |
| 2021/0344086 | A1 | 11/2021 | Fan et al. |
| 2022/0328861 | A1 | 10/2022 | Armstrong et al. |

FOREIGN PATENT DOCUMENTS

| | | |
|---|---|---|
| CN | 207303551 U | 5/2018 |
| CN | 108777271 A | 11/2018 |
| CN | 209929390 U | 1/2020 |
| CN | 110832725 A | 2/2020 |
| CN | 110911772 A | 3/2020 |
| DE | 102012210168 A1 | 12/2013 |
| DE | 202018002067 U1 | 5/2018 |
| IN | 208904154 U | 5/2019 |
| JP | 2013537690 A | 10/2013 |
| JP | 5388175 B2 | 1/2014 |
| JP | 2014045551 A | 3/2014 |
| JP | 2018170850 A | 11/2018 |
| TW | 201543104 A | 11/2015 |
| WO | 2018020906 A1 | 2/2018 |
| WO | 2020066254 A1 | 4/2020 |

OTHER PUBLICATIONS

PCT International Search Report and Written Opinion for Application No. PCT/US2022/021440 on Jun. 22, 2022 (15 pages).

MatWeb. "EMS-Griltech Griltex® D 1365E Copolyester Hotmelt Adhesive (Apparel Interlinings)." Ems-Griltech Griltex® D 1365e Copolyester Hotmelt Adhesive (Apparel Interlinings), 2022, https://www.matweb.com/search/datasheet_print.aspx?matguid=ab4f2d8f8ff54ca897daf437f03a284f. (Year: 2022).

MatWeb. "Dow Amplify™ EA 100 Ethylene-Ethyl Acrylate (EEA)." Dow Amplify™ EA 100 Ethylene-Ethyl Acrylate (EEA), 2022, https://www.matweb.com/search/datasheet_print.aspx?matguid=982b1684d74c4b5991d1eb070eab4d11. (Year: 2022).

MatWeb. "DSM Yparex® 8102 E Polyolefin Adhesive Resin (European Grade)." DSM Yparex® 8102 E Polyolefin Adhesive Resin (European Grade), 2022, https://www.matweb.com/search/datasheet_print.aspx?Matguid=7650714efeea48ef8ec1a53bf1697be1. (Year: 2022).

* cited by examiner

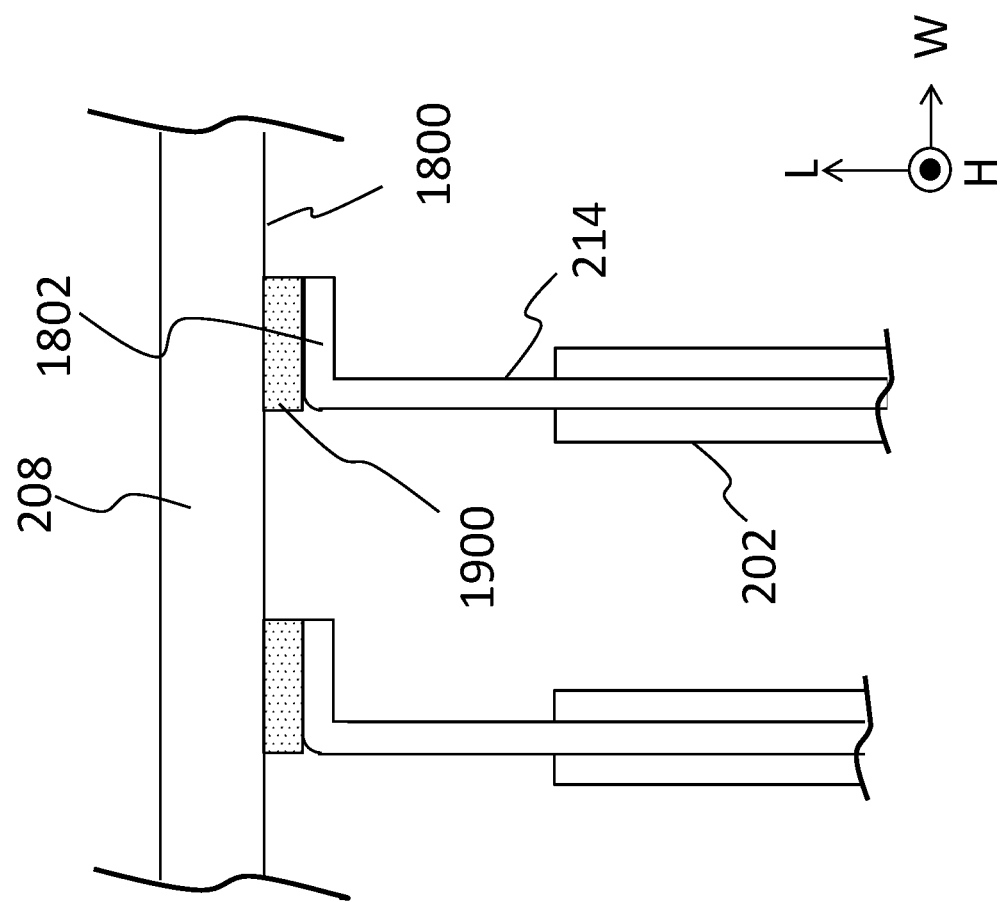

ELECTRODE ASSEMBLIES INCLUDING CURRENT LIMITERS

CROSS REFERENCE TO RELATED APPLICATIONS

This application is a continuation of U.S. patent application Ser. No. 17/657,391 filed on Mar. 31, 2022, which is a continuation of International Application Serial No. PCT/US2022/021440 filed Mar. 22, 2022, which claims priority to U.S. Provisional Patent Application Ser. No. 63/168,430 filed Mar. 31, 2021 and U.S. Provisional Patent Application Ser. No. 63/202,922 filed Jun. 30, 2021, the entire disclosures of which are hereby incorporated by reference in their entireties.

FIELD

The field of the disclosure relates generally to energy storage technology, such as battery technology. More specifically, the field of the disclosure relates to electrode assemblies including current limiters and secondary batteries having such electrode assemblies.

BACKGROUND

Secondary batteries, such as lithium based secondary batteries, have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

FIG. 1 illustrates a cross-sectional view of a known laminar type secondary battery, indicated generally at 10. The battery 10 includes a positive electrode current collector 15 in contact with a positive electrode 20. A negative electrode 25 is separated from the positive electrode 20 by a separator 30. The negative electrode 25 is in contact with a negative electrode current collector 35. As shown in FIG. 1, the battery 10 is formed in a stack. The stack is sometimes covered with another separator layer (not shown) above the negative electrode current collector 35, and then rolled and placed into a can (not shown) to assemble the battery 10. During a charging process, a carrier ion (typically, lithium) leaves the positive electrode 20 and travels through separator 30 into the negative electrode 25. Depending upon the anode material used, the carrier ion either intercalates (e.g., sits in a matrix of negative electrode material without forming an alloy) or forms an alloy with the negative electrode material. During a discharge process, the carrier ion leaves the negative electrode 25 and travels back through the separator 30 and back into the positive electrode 20.

Three-dimensional secondary batteries may provide increased capacity and longevity compared to laminar secondary batteries. Three-dimensional battery architectures (e.g., interdigitated electrode arrays) have been proposed in the literature to provide higher electrode surface area, higher energy and power density, improved battery capacity, and improved active material utilization compared with two-dimensional architectures (e.g., flat and spiral laminates). For example, reference to Long et al., "Three-dimensional battery architectures," Chemical Reviews, 2004, 104, 4463-4492, may help to illustrate the state of the art in proposed three-dimensional battery architectures, and is therefore incorporated by reference as non-essential subject matter herein.

There is a risk that energy storage devices, including secondary batteries, might release energy in an undesirable or uncontrolled manner though accident, abuse, exposure to extreme conditions, or the like. Building safety features into secondary batteries can reduce this risk and improve abuse tolerance.

The safety of current lithium based batteries may be compromised by various mechanisms, many of which are related through a temperature increase phenomenon. Excessive heat and thermal runaway may occur due to electrolyte decomposition at overcharge and at elevated operating temperatures. Thermal runaway might also occur due to oxygen evolution in case of high voltage cathode materials such as $LiCoO_2$. In some cases, mechanical abuse can also cause active materials to short together, thereby resulting in thermal runaway. This could be caused due to overcharging the batteries, electrical shorts, or mechanical abuse related shorting. A rapid release of heat during chemical reactions pertaining to electrolyte or cathode decomposition can increase the risk of thermal runaway in conventional two-dimensional batteries.

Self-stopping devices, for example polymer or ceramic materials with a Positive Temperature Coefficient (PTC) of resistance, have been used to enhance the safety of conventional two-dimensional batteries. Such materials are sometimes referred to as resettable fuses or self-regulating thermostats. Other systems have been proposed that include non-resettable or sacrificial fuses that melt to mechanically create an open circuit that interrupts the flow of excess current through a battery. For example, reference to P. G. Balakrishnan, R. Ramesh, and T. Prem Kumar, "Safety mechanisms in lithium-ion batteries," Journal of Power Sources, 2006, 155, 401-414 may help to illustrate the state of the art in safety mechanisms in conventional lithium-ion batteries, and is therefore incorporated by reference as non-essential subject matter herein.

In at least some known lithium based secondary batteries, the resettable or non-resettable fuses have a measurable lag between the flow of excess current and the tripping of the fuse. This lag occurs because the fuses are typically activated by the heat generated when excess current flows through the battery. Thus, excess current will flow through the battery for some time until the temperature experienced by the fuse reaches the temperature required to melt the fuse, in the case of a non-resettable fuse, or increase the resistance enough to limit the current flowing through the battery, in the case of a resettable fuse using a PTC material. In some circumstances, the lag between the onset of excess current and tripping of the fuse may result in the failure of the fuse to prevent thermal runaway.

Further, non-resettable fuses permanently disconnect at least a portion of a battery when the fuse is tripped. As a result, even if the fuse prevents thermal runaway and catastrophic failure, the battery will either be completely inoperable or will only operate with a limited capacity.

Thus, it would be desirable to produce three-dimensional batteries that include current limiters to limit the current that may flow through the battery independent of the temperature of the battery to address the issues in the known art.

BRIEF DESCRIPTION

In one embodiment, a method of assembling an electrode assembly includes stacking a population of unit cells atop each other in a stacking direction. Each member of the unit cell population includes an electrode structure, a separator structure, and a counter-electrode structure, wherein the electrode structure comprises an electrode current collector and an electrode active material layer, the counter-electrode structure comprises a counter-electrode current collector and a counter-electrode active material layer, the electrode structure and the counter-electrode structure extend in a longitudinal direction perpendicular to the stacking direction, and an end portion of the electrode current collector extends past the electrode active material and the separator structure in the longitudinal direction. The method includes bending the end portion of each electrode current collector in a direction orthogonal to the longitudinal direction of the electrode structure and to extend in the stacking direction or opposite the stacking direction. An electrode busbar is positioned extending in the stacking direction with a surface of the electrode busbar adjacent the end portions of the electrode current collectors. Heat and pressure are applied to the electrode busbar to adhere the end portions of the electrode current collectors to the busbar through an adhesive layer comprising a resistive polymeric material.

In another embodiment, an electrode assembly for cycling between a charged state and a discharged state includes a population of unit cells stacked atop each other in a stacking direction, each member of the unit cell population including an electrode structure, a separator structure, and a counter-electrode structure. The electrode structure comprises an electrode current collector and an electrode active material layer. The electrode structure extends in a longitudinal direction perpendicular to the stacking direction, an end portion of the electrode current collector extends past the electrode active material and the separator structure in the longitudinal direction, and the end portion of each electrode current collector is bent in a direction orthogonal to the longitudinal direction of the electrode structure and extends in the stacking direction or opposite the stacking direction. The counter-electrode structure comprises a counter-electrode current collector and a counter-electrode active material layer, the counter-electrode structure extends in a longitudinal direction perpendicular to the stacking direction. The electrode assembly includes an adhesive layer comprising a resistive polymeric material, and an electrode busbar positioned with a surface of the electrode busbar adjacent the end portions of the electrode current collectors and extending in the stacking direction. The electrode busbar is attached to the end portions of the electrode current collectors to the busbar through the adhesive layer.

Various refinements exist of the features noted in relation to the above-mentioned aspects. Further features may also be incorporated in the above-mentioned aspects. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 19 is a side view of one of an electrode structure with its current collector attached to the busbar through a discrete current limiter formed as a unitary layer without the use of a slot in the current collector.

Corresponding reference characters indicate corresponding parts throughout the drawings.

Definitions

Figure 1:
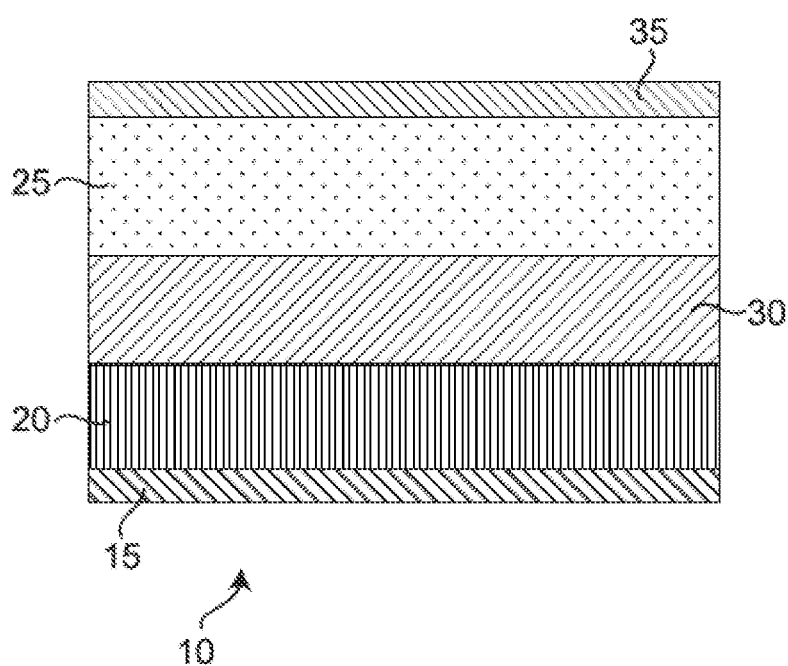
FIG. 1 is a cross-section of an existing laminar battery.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anode material" or "Anodically active" as used herein means material suitable for use as the negative electrode of a secondary battery "Cathode" as used herein in the context of a secondary battery refers to the positive electrode in the secondary battery "Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter-electrode" as used herein may refer to the negative or positive electrode (anode or cathode), opposite of the Electrode, of a secondary battery unless the context clearly indicates otherwise.

"Counter-electrode current collector" as used herein may refer to the negative or positive (anode or cathode) current collector, opposite of the Electrode current connector, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector" as used herein may refer to the negative or positive (anode or cathode) current collector of a secondary battery unless the context clearly indicates otherwise.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

DETAILED DESCRIPTION

Embodiments of the present disclosure relate to batteries, such as three-dimensional secondary batteries, and electrode assemblies for such batteries that include current limiters to limit the current that may flow through the battery to thereby limit thermal increases, help prevent thermal runaway, and improve the safety of the battery.

Figure 2:
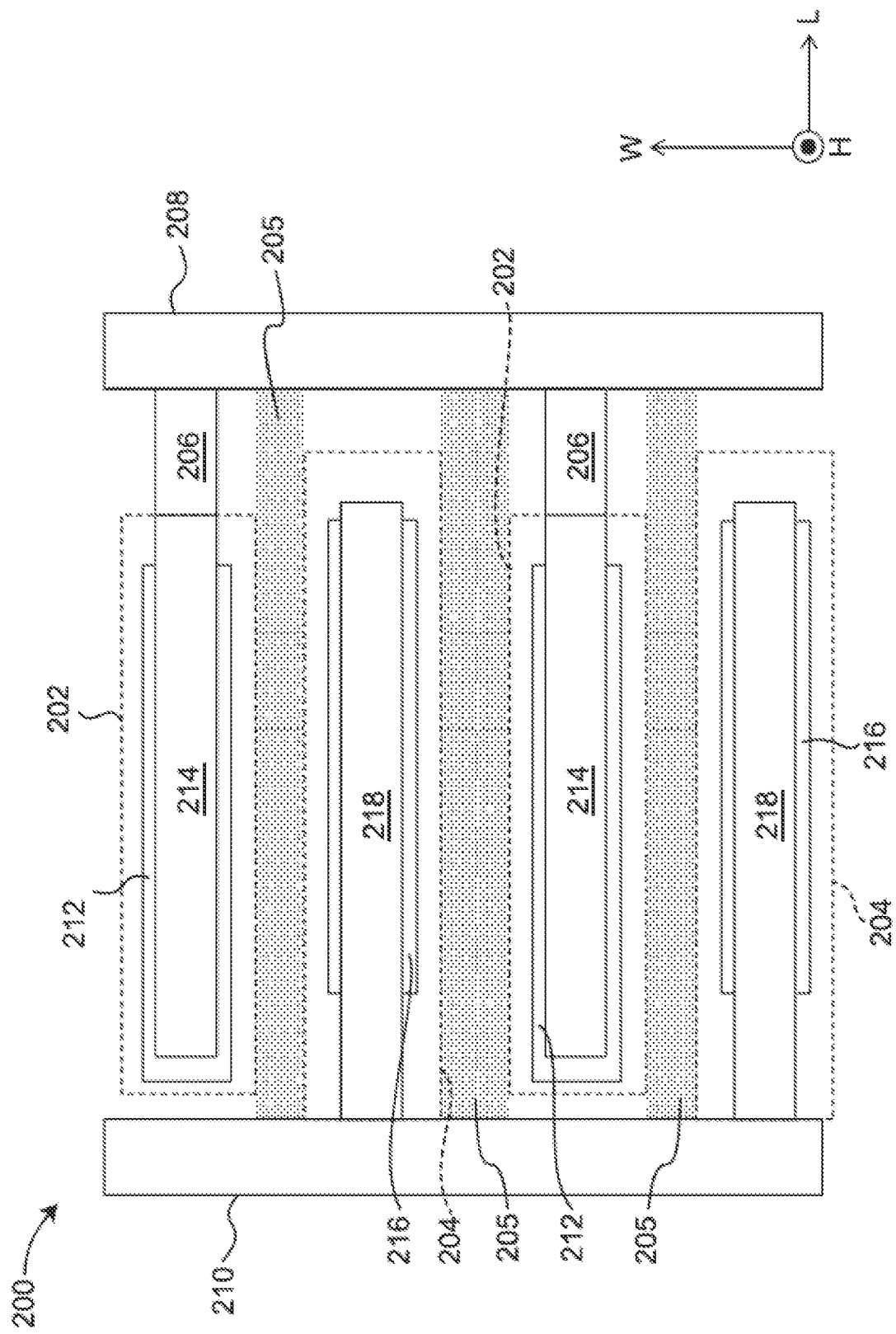
FIG. 2 is a simplified diagram of an example electrode assembly for cycling between a charged state and a discharged state in a secondary battery.

FIG. 2 is a simplified diagram of an example electrode assembly 200 for cycling between a charged state and a discharged state in a battery. The electrode assembly 200 includes a population of electrode structures 202, a population of counter-electrode structures 204, a population of separator structures 205, a population of current limiters 206, an electrode busbar 208, and a counter-electrode busbar 210. The example embodiment is an electrode assembly suitable for use in a three-dimensional secondary battery, in which the electrode structures 202 and counter-electrode structures 204 each extend primarily along a width W and height H of the assembly and are separated from each other along a length (or longitudinal) direction L. In other embodiments, the electrode assembly 200 may be for use in a laminar secondary battery.

A voltage difference V exists between adjacent electrode structures 202 and counter-electrode structures 204, which adjacent pairs may be considered a unit cell. Each unit cell has a capacity C determined by the makeup and configuration of the electrode structures 202 and counter-electrode structures 204. In the example embodiment, each unit cell produces a voltage difference of about 4.35 volts. In other embodiments, each unit cell has a voltage difference of about 0.5 volts, about 1.0 volts, about 1.5 volts, about 2.0 volts, about 2.5 volts, about 3.0 volts, about 3.5 volts, about 4.0 volts, 4.5 volts, about 5.0 volts, between 4 and 5 volts, or any other suitable voltage. During cycling between charged and discharged, the voltage may vary, for example, between about 2.5 volts and about 4.35 volts. The capacity C of a unit cell in the example embodiment is about 25 mAh. In other embodiments, the capacity C of a unit cell is about 50 mAh, less than 50 mAh, or any other suitable capacity. In some embodiments, the capacity C of a unit cell may be up to about 500 mAh.

In the example embodiment, the electrode structures 202 and counter-electrode structures 204 are generally rectangular and arranged in an interdigitated structure. That is, the electrode structures 202 and counter-electrode structures 204 extend from opposite electrode and counter-electrode busbars 208, 210 and alternate along the length direction L. In other embodiments, other shapes and arrangements of the electrode structures 202 and counter-electrode structures 204 are used. For example, the electrode assembly 200 (and the battery within which it is included) may have any of the shapes and/or arrangements described or shown in U.S. Pat. No. 9,166,230, which is hereby incorporated by reference in its entirety.

Each member of the population of electrode structures 202 includes an electrode active material 212 and an electrode current collector 214. The electrode structures 202 are electrically connected in parallel to the electrode busbar 208 through a current limiter 206. The electrode structures 202 may be anodic or cathodic, but all of the electrode structures 202 in the population are of the same type (anodic or cathodic) in the example embodiment. In some other embodiments, the electrode structures 202 may include anodic and cathodic structures. Each member of the population of counter-electrode structures 204 includes a counter-electrode active material 216 and a counter-electrode current collector 218. The counter-electrode structures 204 are electrically connected in parallel to the counter-electrode busbar 210. The counter-electrode structures 204 are all of the same type (anodic or cathodic) in the example embodiment, and are of the opposite type to the electrode structures 204. In some other embodiments, the counter-electrode structures 202 may include anodic and cathodic structures. Although only two electrode structures 202 and two counter-electrode structures 204 are shown in FIG. 2, the electrode assembly 200 may have any number of electrode structures 202 and counter-electrode structures 204. The populations of electrode structures 202 and counter-electrode structures 204 will generally include the same number of members, but may include different numbers of electrode structures 202 and counter-electrode structures 204 in some embodiments. For example, some embodiments may begin and end with the same electrode structure 202 or counter-electrode structure, resulting in one more electrode structure 202 or counter-electrode structure. In some embodiments, the populations of electrode structures 202 and counter-electrode structures 204 include at least twenty members each. Some embodiments include populations of electrode structures 202 and counter-electrode structures 204 having about 10 members each, between 10 and 25 members each, between 25 and 250 members each, between 25 and 150 members each, between 50 and 150 members each, or up to 500 members each. In some embodiments, the electrode structures 202 or the counter electrode structures 204 do not include an active material when discharged, and only the other of the counter electrode structures 204 or the electrode structures 202 includes an active material when discharged.

The cathodic type of the electrode structure 202 or the counter-electrode structure 204 includes a current collector 214 or 218 that is a cathode current collector. The cathode current collector may comprise aluminum, nickel, cobalt, titanium, and tungsten, or alloys thereof, or any other material suitable for use as a cathode current collector layer. In general, the cathode current collector will have an electrical conductivity of at least about $10^3$ Siemens/cm. For example, in one such embodiment, the cathode current collector will have a conductivity of at least about $10^4$ Siemens/cm. By way of further example, in one such embodiment, the cathode current collector will have a conductivity of at least about $10^5$ Siemens/cm. The anodic type of the electrode structure 202 or the counter-electrode structure 204 includes a current collector 214 or 218 that is an anode current collector. The anode current collector may comprise a conductive material such as copper, carbon, nickel, stainless steel, cobalt, titanium, and tungsten, and alloys thereof, or any other material suitable as an anode current collector layer.

The cathodic type of the electrode structure 202 or the counter-electrode structure 204 includes an active material 212 or 216 that is a cathodically active material. The cathodically active material may be an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$, and the like.

Exemplary cathodically active materials also include any of a wide range of intercalation type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathodically active material will have a thickness of at least about 20 μm in whichever of the electrode structure 202 or the counter-electrode structure 204 is the cathodic type structure. For example, in one embodiment, the cathodically active material will have a thickness of at least about 40 μm. By way of further example, in one such embodiment, the cathodically active material will have a thickness of at least about 60 μm. By way of further example, in one such embodiment, the cathodically active material will have a thickness of at least about 100 μm. Typically, however, the cathodically active material will have a thickness of less than about 90 μm or even less than about 70 μm.

The anodic type of the electrode structure 202 or the counter-electrode structure 204 includes an active material 212 or 216 that is an anodically active material. In general, the anodically active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, ZnCo2O4; (f) particles of graphite and carbon; (g) lithium metal, and (h) combinations thereof.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy or oxide thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of (each of) the anodically active material layer(s) is at least 0.1. Typically, however, the void volume fraction of (each of) the anodically active material layer(s) is not greater than 0.8. For example, in one embodiment, the void volume fraction of (each of) the anodically active material layer(s) is about 0.15 to about 0.75. By way of the further example, in one embodiment, the void volume fraction of (each of) the anodically active material layer(s) is about 0.2 to about 0.7. By way of the further example, in one embodiment, the void volume fraction of (each of) the anodically active material layer(s) is about 0.25 to about 0.6.

Depending upon the composition of the microstructured anodically active material and the method of its formation, the microstructured anodically active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the anodically active material contains voids having openings at the lateral surface of the negative electrode active material through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interface while each provides room for expansion of the anodically active material upon the entry of carrier ions. In certain embodiments, therefore, it is preferred that the anodically active material comprise a combination of open and closed voids.

In one embodiment, the anodically active material comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, the anodically active material comprises porous silicon, has a thickness of about 5 to about 100 micrometers, and has a porosity fraction of about 0.15 to about 0.75. By way of further example, in one embodiment, the anodically active material comprises porous silicon, has a thickness of about 10 to about 80 micrometers, and has a porosity fraction of about 0.15 to about 0.7. By way of further example, in one such embodiment, the anodically active material comprises porous silicon, has a thickness of about 20 to about 50 micrometers, and has a porosity fraction of about 0.25 to about 0.6. By way of further example, in one embodiment, the anodically active material comprises a porous silicon alloy (such as nickel silicide), has a thickness of about 5 to about 100 micrometers, and has a porosity fraction of about 0.15 to about 0.75.

In another embodiment, the anodically active material comprises fibers of aluminum, tin or silicon, or an alloy thereof. Individual fibers may have a diameter (thickness dimension) of about 5 nm to about 10,000 nm and a length generally corresponding to the thickness of the anodically active material. Fibers (nanowires) of silicon may be formed, for example, by chemical vapor deposition or other techniques known in the art such as vapor liquid solid (VLS) growth and solid liquid solid (SLS) growth. Additionally, the anodically active material will generally have a porosity fraction of at least about 0.1, but less than 0.8 and have a thickness of about 1 to about 200 micrometers. For example, in one embodiment, the anodically active material comprises silicon nanowires, has a thickness of about 5 to about 100 micrometers, and has a porosity fraction of about 0.15 to about 0.75. By way of further example, in one embodiment, the anodically active material comprises silicon nanowires, has a thickness of about 10 to about 80 micrometers, and has a porosity fraction of about 0.15 to about 0.7. By way of further example, in one such embodiment, the anodically active material comprises silicon nanowires, has a thickness of about 20 to about 50 micrometers, and has a porosity fraction of about 0.25 to about 0.6. By way of further example, in one embodiment, the anodically active material comprises nanowires of a silicon alloy (such as nickel silicide), has a thickness of about 5 to about 100 micrometers, and has a porosity fraction of about 0.15 to about 0.75.

In yet other embodiments, the anodic negative electrode (i.e., the electrode or the counter-electrode) is coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the negative electrode active material layer by spraying, loading or otherwise disposing the lithium particulate material onto the negative electrode active material layer at a loading amount of about 0.05 to 5 mg/cm$^2$, e.g., about 0.1 to 4 mg/cm$^2$, or even about 0.5 to 3 mg/cm$^2$. The average particle size ($D_{50}$) of the lithium particulate material may be 5 to 200 µm, e.g., about 10 to 100 µm, 20 to 80 µm, or even about 30 to 50 µm. The average particle size ($D_{50}$) may be defined as a particle size corresponding to 50% in a cumulative volume-based particle size distribution curve. The average particle size ($D_{50}$) may be measured, for example, using a laser diffraction method.

The anodic type of the electrode structure 202 or the counter-electrode structure 204 includes a current collector 214 or 218 that is an anodic current collector. In general, the anode current collector will have an electrical conductivity of at least about 10$^3$ Siemens/cm. For example, in one such embodiment, the anode current collector will have a conductivity of at least about 10$^4$ Siemens/cm. By way of further example, in one such embodiment, the anode current collector will have a conductivity of at least about 10$^5$ Siemens/cm. Exemplary electrically conductive materials suitable for use as anode current collectors include metals, such as, copper, nickel, cobalt, titanium, and tungsten, and alloys thereof.

In one embodiment, anodic current collectors, that is whichever of the electrode current collector 214 or the counter-electrode current collector 218 is the anodic type, has an electrical conductance that is substantially greater than the electrical conductance of its associated electrode or counter-electrode active material 212, 216. For example, in one embodiment the ratio of the electrical conductance of anodic current collector to the electrical conductance of the anodic active material is at least 100:1 when there is an applied current to store energy in the device or an applied load to discharge the device. By way of further example, in some embodiments the ratio of the electrical conductance of anodic current collector to the electrical conductance of the anodic active material at least 500:1 when there is an applied current to store energy in the device or an applied load to discharge the device. By way of further example, in some embodiments the ratio of the electrical conductance of anodic current collector to the electrical conductance of the anodic active material is at least 1000:1 when there is an applied current to store energy in the device or an applied load to discharge the device. By way of further example, in some embodiments the ratio of the electrical conductance of anodic current collector to the electrical conductance of the anodic active material layer is at least 5000:1 when there is an applied current to store energy in the device or an applied load to discharge the device. By way of further example, in some embodiments the ratio of the electrical conductance of anodic current collector to the electrical conductance of the anodic active material is at least 10,000:1 when there is an applied current to store energy in the device or an applied load to discharge the device.

In general, the cathodic type current collectors, that is whichever of the electrode current collector 214 or the counter-electrode current collector 218 is the cathodic type, may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, the cathodic current collectors comprise gold or an alloy thereof such as gold silicide. By way of further example, in one embodiment, the cathodic current collectors comprise nickel or an alloy thereof such as nickel silicide.

Figure 8A:
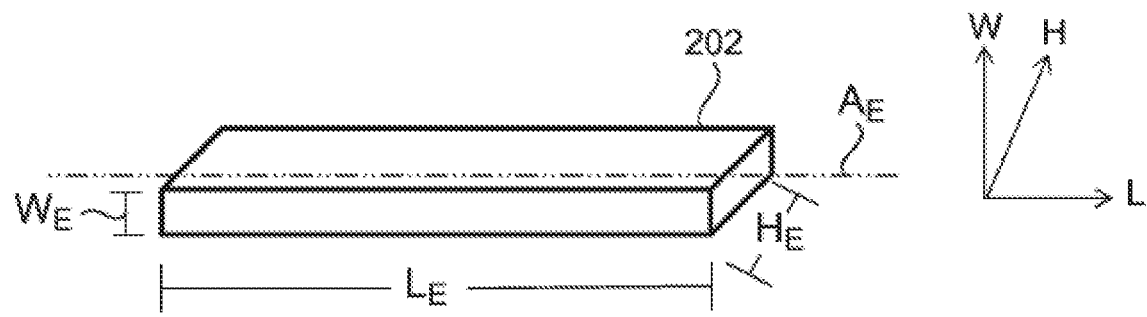
FIG. 8A is a simplified isometric view of an anodic electrode structure for use in an electrode assembly.

With reference to FIG. 8A, each anodic electrode structure, that is each electrode structure 202, or counter-electrode-structure 204 that is of the anodic type, has a length ($L_E$) measured along a longitudinal axis ($A_E$) of the electrode, a width ($W_E$), and a height ($H_E$) measured in a direction that is orthogonal to each of the directions of measurement of the length $L_E$ and the width $W_E$.

The length $L_E$ of the members of the population of anodic electrode structure will vary depending upon the energy storage device and its intended use. In general, however, the anodic electrode structures will typically have a length $L_E$ in the range of about 5 mm to about 500 mm. For example, in one such embodiment, the anodic electrode structures have a length $L_E$ of about 10 mm to about 250 mm. By way of further example, in one such embodiment the members of the anode population have a length $L_E$ of about 25 mm to about 100 mm. According to one embodiment, the anodic electrode structures include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having a different lengths along one or more of the longitudinal and/or transverse axis, and/or to provide predetermined performance characteristics for the secondary battery.

The width $W_E$ of the anodic electrode structures will also vary depending upon the energy storage device and its intended use. In general, however, each anodic electrode structure will typically have a width $W_E$ within the range of about 0.01 mm to 2.5 mm. For example, in one embodiment, the width $W_E$ of each anodic electrode structure will be in the range of about 0.025 mm to about 2 mm. By way of further example, in one embodiment, the width $W_E$ of each anodic electrode structure will be in the range of about 0.05 mm to about 1 mm. According to one embodiment, the anodic electrode structures include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having a different widths along one or more of the longitudinal and/or transverse axis, and/or to provide predetermined performance characteristics for the secondary battery.

The height $H_E$ of the anodic electrode structures will also vary depending upon the energy storage device and its intended use. In general, however, the anodic electrode structures will typically have a height $H_E$ within the range of about 0.05 mm to about 25 mm. For example, in one embodiment, the height $H_E$ of each anodic electrode structure will be in the range of about 0.05 mm to about 5 mm. By way of further example, in one embodiment, the height $H_E$ of each anodic electrode structure will be in the range of about 0.1 mm to about 1 mm. According to one embodiment, the anodic electrode structures include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, the anodic electrode structures have a length $L_E$ that is substantially greater than each of its width $W_E$ and its height $H_E$. For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the anode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the anode population.

In one embodiment, the ratio of the height $H_E$ to the width $W_E$ of the anodic electrode structures is at least 0.4:1, respectively. For example, in one embodiment, the ratio of $H_E$ to $W_E$ will be at least 2:1, respectively, for each member of the anode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the anodic electrode structure population.

Figure 8B:
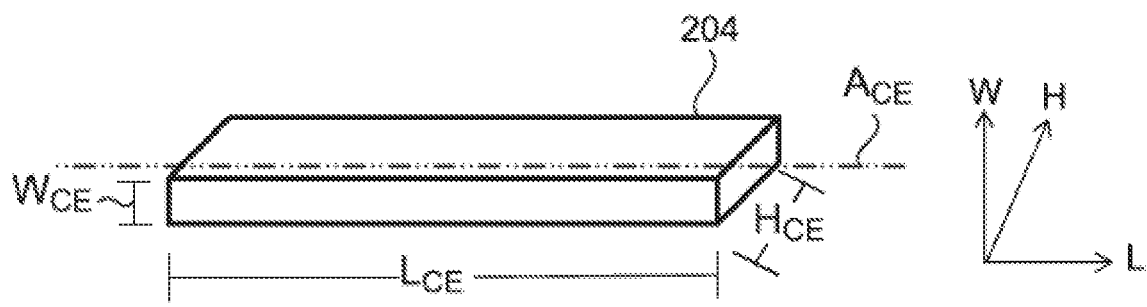
FIG. 8B is a simplified isometric view of a cathodic electrode structure for use in an electrode assembly.

With reference to FIG. 8B, each cathodic electrode structure, that is each electrode structure 202 or counter-electrode-structure 204 that is of the cathodic type, has a length ($L_{CE}$) measured along the longitudinal axis ($A_{CE}$), a width ($W_{CE}$), and a height ($H_{CE}$) measured in a direction that is perpendicular to each of the directions of measurement of the length $L_{CE}$ and the width $W_{CE}$.

The length $L_{CE}$ of the cathodic electrode structures will vary depending upon the energy storage device and its intended use. In general, however, each member of the cathode population will typically have a length $L_{CE}$ in the range of about 5 mm to about 500 mm. For example, in one such embodiment, each cathodic electrode structure has a length $L_{CE}$ of about 10 mm to about 250 mm. By way of further example, in one such embodiment each cathodic electrode structure has a length $L_{CE}$ of about 25 mm to about 100 mm. According to one embodiment, the cathodic electrode structures include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having a different lengths along one or more of the longitudinal and/or transverse axis, and/or to provide predetermined performance characteristics for the secondary battery.

The width $W_{CE}$ of the cathodic electrode structures will also vary depending upon the energy storage device and its intended use. In general, however, cathodic electrode structures will typically have a width $W_{CE}$ within the range of about 0.01 mm to 2.5 mm. For example, in one embodiment, the width $W_{CE}$ of each cathodic electrode structure will be in the range of about 0.025 mm to about 2 mm. By way of further example, in one embodiment, the width $W_{CE}$ of each cathodic electrode structure will be in the range of about 0.05 mm to about 1 mm. According to one embodiment, the cathodic electrode structures include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having a different widths along one or more of the longitudinal and/or transverse axis, and/or to provide predetermined performance characteristics for the secondary battery.

The height $H_{CE}$ of the cathodic electrode structures will also vary depending upon the energy storage device and its intended use. In general, however, cathodic electrode structures will typically have a height $H_{CE}$ within the range of about 0.05 mm to about 25 mm. For example, in one embodiment, the height $H_{CE}$ of each cathodic electrode structure will be in the range of about 0.05 mm to about 5 mm. By way of further example, in one embodiment, the height $H_{CE}$ of each cathodic electrode structure will be in the range of about 0.1 mm to about 1 mm. According to one embodiment, the cathodic electrode structures include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, each cathodic electrode structure has a length $L_{CE}$ that is substantially greater than width $W_{CE}$ and substantially greater than its height $H_{CE}$. For example, in one embodiment, the ratio of $L_{CE}$ to each of $W_{CE}$ and $H_E$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each cathodic electrode structure. By way of further example, in one embodiment the ratio of $L_{CE}$ to each of $W_{CE}$ and $H_{CE}$ is at least 10:1 for each cathodic electrode structure. By way of further example, in one embodiment, the ratio of $L_{CE}$ to each of $W_{CE}$ and $H_{CE}$ is at least 15:1 for each cathodic electrode structure. By way of further example, in one embodiment, the ratio of $L_{CE}$ to each of $W_{CE}$ and $H_{CE}$ is at least 20:1 for each cathodic electrode structure.

In one embodiment, the ratio of the height $H_{CE}$ to the width $W_{CE}$ of the cathodic electrode structures is at least 0.4:1, respectively. For example, in one embodiment, the ratio of $H_{CE}$ to $W_{CE}$ will be at least 2:1, respectively, for each cathodic electrode structure. By way of further example, in one embodiment the ratio of $H_{CE}$ to $W_{CE}$ will be at least 10:1, respectively, for each cathodic electrode structure. By way of further example, in one embodiment the ratio of $H_{CE}$ to $W_{CE}$ will be at least 20:1, respectively, for each cathodic electrode structure. Typically, however, the ratio of $H_{CE}$ to $W_{CE}$ will generally be less than 1,000:1, respectively, for each member of the anode population. For example, in one embodiment the ratio of $H_{CE}$ to $W_{CE}$ will be less than 500:1, respectively, for each cathodic electrode structure. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each cathodic electrode structure.

Returning to FIG. 2, the separator structures 205 separate the electrode structures 202 from the counter-electrode structures. The separator structures 205 are made of electrically insulating but ionically permeable separator material. The separator structures 205 are adapted to electrically isolate each member of the population of electrode structures 202 from each member of the population of counter-electrode structures 204. Each separator structure 205 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%

In general, the electrically insulating separator material will have a thickness of at least about 4 µm. For example, in one embodiment, the electrically insulating separator material will have a thickness of at least about 8 µm. By way of further example, in one such embodiment the electrically insulating separator material will have a thickness of at least about 12 µm. By way of further example, in one such embodiment the electrically insulating separator material will have a thickness of at least about 15 µm. In some embodiments, the electrically insulating separator material will have a thickness of up to 25 µm, up to 50 µm, or any other suitable thickness. Typically, however, the electrically insulating separator material will have a thickness of less than about 12 µm or even less than about 10 µm.

In general, the material of the separator structures 205 may be selected from a wide range of material having the capacity to conduct carrier ions between the positive and negative active material of a unit cell. For example, the separator structures 205 may comprise a microporous separator material that may be permeated with a liquid, non-aqueous electrolyte. Alternatively, the separator structures 205 may comprise a gel or solid electrolyte capable of conducting carrier ions between the positive and negative electrodes of a unit cell.

In one embodiment, the separator structures 205 may comprise a polymer based electrolyte. Exemplary polymer electrolytes include PEO-based polymer electrolytes, polymer-ceramic composite electrolytes, polymer-ceramic composite electrolytes, and polymer-ceramic composite electrolyte.

In another embodiment, the separator structures 205 may comprise an oxide based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

In another embodiment, the separator structures 205 may comprise a solid electrolyte. Exemplary solid electrolytes include sulfide based electrolytes such as lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

In some embodiments, the separator structures 205 may comprise a solid-state lithium ion conducting ceramic, such as a lithium-stuffed garnet.

In one embodiment, the separator structures 205 comprise a microporous separator material comprising a particulate material and a binder, and having a porosity (void fraction) of at least about 20 vol. %. The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, and $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled battery, the microporous separator material of the separator structures 205 is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

In one embodiment, the separator structures' microporous separator may be permeated with a non-aqueous, organic electrolyte including a mixture of a lithium salt and a high-purity organic solvent. In addition, the electrolyte may be a polymer using a polymer electrolyte or a solid electrolyte.

The electrode busbar 208 is a cathodic electrode busbar when the electrode structure 202 is a cathodic type, and is an anodic electrode busbar when the electrode structure 202 is an anodic type. Similarly, the counter-electrode busbar is a cathodic electrode busbar when the counter-electrode structure 204 is a cathodic type, and is an anodic electrode busbar when the counter-electrode structure 204 is an anodic type. In the example embodiment, the anodic type busbar is a copper busbar and the cathodic type busbar is an aluminum busbar. In other embodiments, the electrode busbar 208 and the counter-electrode busbar 210 may be any suitable conductive material to allow the electrode assembly 200 to function as described herein.

The counter-electrode structures 204, and more specifically, the counter-electrode current collectors 218, are directly connected to the counter-electrode busbar 210. That is, the counter-electrode current collectors 218 are welded, soldered, or glued to the counter-electrode busbar 210 without any components electrically or physically positioned between them. The welds may be made using a laser welder, friction welding, ultrasonic welding or any suitable welding method for welding the counter-electrode busbar 210 to the counter-electrode current collectors 218.

Figure 3A:
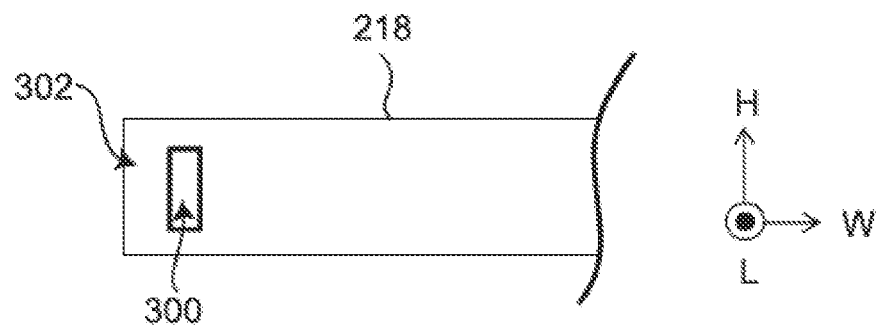
FIG. 3A is a simplified diagram of an end of a counter-electrode current collector of the electrode assembly of FIG. 2.
Figure 3B:
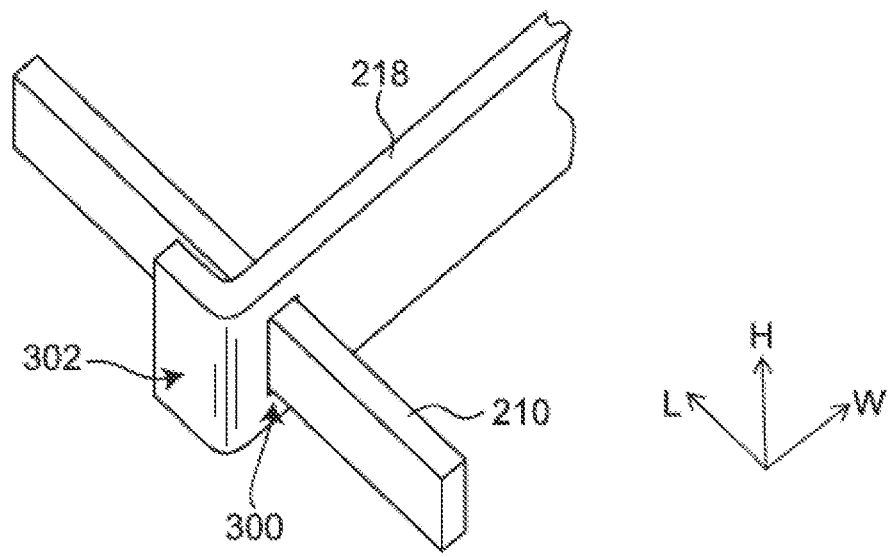
FIG. 3B is a diagram of the end of a counter-electrode current collector in FIG. 3A connected to a counter-electrode busbar.

FIGS. 3A and 3B illustrate an example technique for connection between one of the counter-electrode current collectors 218 and the counter-electrode busbar 210. FIG. 3A is a view of an end portion of one of the counter-electrode current collectors 218. The end of the counter-electrode current collector 218 includes a slot 300 that is sized and shaped to receive the counter-electrode busbar 210. A portion 302 of the counter-electrode current collector 218 extends past the slot 300. The counter-electrode busbar 210 is inserted through the slot 300, and the portion 302 of the counter-electrode current collectors 218 is bent over to contact the counter-electrode busbar 210, as shown in FIG. 3B. The portion 302 of the counter-electrode current collector 218 that is in contact with the counter-electrode busbar 210 is then welded to the counter-electrode busbar 210.

Figure 17:
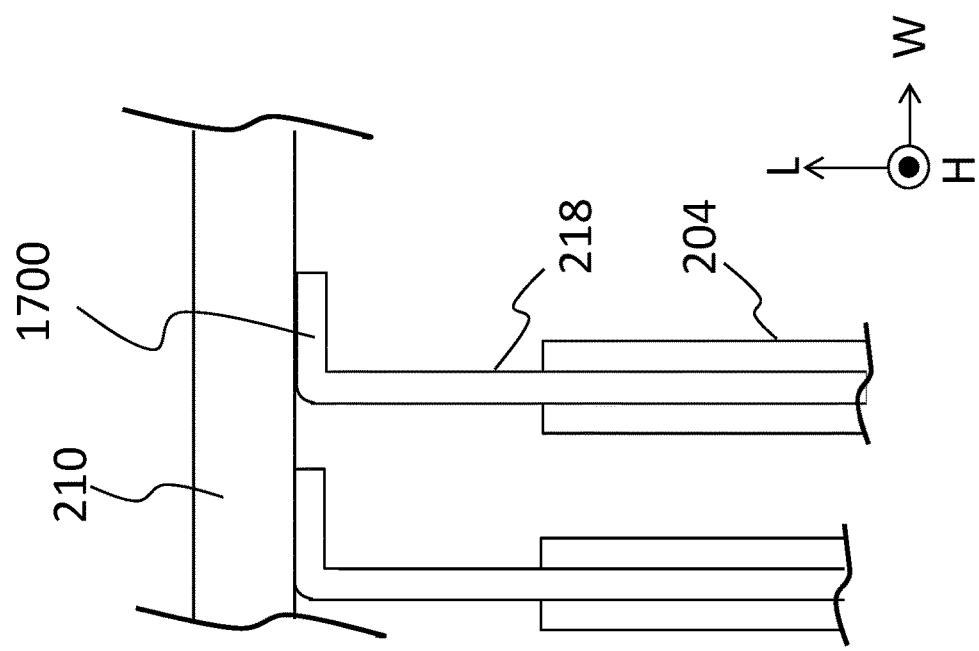
FIG. 17 is a side view of a counter-electrode current collector connected to a counter-electrode busbar without the use of a slot in the current collector.

FIG. 17 illustrates another example technique for connection between one of the counter-electrode current collectors 218 and the counter-electrode busbar 210. In this example, the counter-electrode current collector 218 does not include the slot 300. A portion 1700 of the counter-electrode current collector 218 is bent to approximately a ninety degree angle and the counter-electrode busbar 210 is positioned over the portion 1700. The counter-electrode busbar 210 is then attached directly to the portion 1700 of the counter-electrode current collector 218, such as by gluing, welding, soldering, or using any other suitable technique for joining the counter-electrode current collectors 218 to the counter-electrode busbar 210.

Returning to FIG. 2, each member of the population of current limiters 206 is electrically connected between a different electrode current collector 214 and the electrode busbar 208. The current limiters 206 are configured to limit the current that may flow through the electrode current collector 214, and correspondingly through the electrode structure 202, to which it is connected. Thus, for example, if a short circuit is formed between one of the electrode current collectors 214 and one of the counter-electrode current collectors 218, the current limiter 206 limits the amount of current that can flow from the other electrodes and counter electrodes of the electrode assembly and thereby limits the temperature experienced by the electrode assembly 200 and a thermal runaway is prevented. Specifically, the current limiters 206 limit an amount of current that may be conducted through a unit cell during a discharge of the electrode assembly in which there is an electrical short between the electrode and counter-electrode of the unit cell to a value I, which is less than a current (sometimes referenced herein as $I_{tr}$ or $I_L$) through a member of the unit cell population that would induce thermal runaway of the member of the unit cell population. The current limiters provide a soft landing for the battery in the event of a short circuit. The current limiters continuously allow a non-zero level of current to flow in the event of a short circuit, but limit that current to below a level that would trigger a thermal runaway. This current will continue to flow until the battery is discharged and the risk of thermal runaway is ended.

The current limiters 206 are resistive current limiters. The current limiters 206 have a nonzero resistance within the range of normal operating temperatures of the electrode assembly 200. In one example, the normal operating temperatures are between negative twenty ° C. and eighty ° C. In other embodiments, the normal operating temperatures are between negative forty ° C. and eighty-five ° C., between negative forty ° C. and one hundred and fifty ° C., or any other suitable range of normal operating temperatures. The resistance is such that the current limiters 206 limit the current that may pass through any unit cell and prevent the current from reaching a level that may cause catastrophic failure or any other maximum current level that is determined for other performance or abuse tolerance reasons as determined during battery design. The current limiters 206 do not rely on a fuse or any PTC characteristic of the resistive material. That is, although the current limiters 206 may exhibit PTC, a PTC is not required for the current limiters 206 to function as described herein. Rather, the resistance of the current limiters 206 in the range of normal operating temperatures of the electrode assembly 200 is sufficient to limit the current. In some embodiments, the resistance may increase or decrease (i.e., the current limiters may have a negative temperature coefficient) within the normal range of operating temperatures. The current limiters 206 are each electrically in series with the electrode current collector 214 to which it is attached. Thus, the resistance of each current limiter 206 and its associated electrode structure 202 is increased by adding the resistance of the associated electrode structure 202 and the resistance of the current limiter 206 attached thereto. Adding resistance to a battery is conventionally discouraged, because the added resistance will increase the losses experienced by the battery when current is flowing into the electrode structures 202 (during charging) and out of the electrode structures (during discharge). However, because the electrode current collectors 214 are all connected to the electrode busbar 208 in parallel (electrically parallel), the increase in total resistance seen at the electrode busbar 208 is much smaller than the resistance of each individual current limiter 206. Moreover, the resistance of the current limiters 206 in this disclosure is selected to be small enough to have a limited voltage drop across the current limiters 206 and thereby have a limited loss of power. In the example embodiment, the resistance of the current limiters is selected to have no more than a 20 mV drop across each of the current limiters 206 during charging or discharging at a 1 C rate to limit losses during normal operation while still protecting the battery during a short circuit.

In the example embodiment, each individual unit cell, that is each pair of one electrode structure 202 and one counter-electrode structure 204, without a current limiter 206 has a relatively small size (compared to a laminar battery), a relatively low capacity, and an internal resistance high enough that current through an isolated unit cell cannot reach levels sufficient to cause thermal runaway and catastrophic failure, even when there is a short circuit between the electrode structure 202 and the counter-electrode structure 204 of the unit cell. However, when multiple unit cells are connected in parallel to a busbar, such as the busbar 208, in an electrode assembly, such as electrode assembly 200, all of the unit cells contribute current to the unit cell that has a short circuit within it. Under such circumstances, without a current limiter 206, sufficient current may pass through the shorted unit cell to cause thermal runaway and catastrophic failure of the electrode assembly 200 and the battery containing it. By adding the current limiters 206, the resistance of a unit cell is effectively increased. With the fixed voltage V of the unit cells, increasing the resistance will result in a corresponding reduction in the maximum current according to Ohm's law.

More specifically, the capacity of the electrode assembly 200 is subdivided into a number (n) of electrode unit cells, each of which includes one electrode structure 202 and one counter-electrode structure 204. Each unit cell forms a voltage (V). Each individual electrode unit cell has its own characteristic resistance ($R_{bl}$) which is a function of conductivity and geometry of the unit cell assembly. Each individual unit cell is capable of discharging a power ($\dot{q}_{bl}$) across a short circuit, such as forced internal short circuit (FISC) resistance ($R_s$). For an individual unit cell, the FISC power is given by:

$$\dot{q}_{bl} = \frac{V^2}{R_s + R_{bl}} \quad (1)$$

When electrode structure 202 and counter-electrode structure 204 of each unit cell are connected in parallel to their respective busbars 208, 210, all unit cells contribute power discharging across the FISC ($\dot{q}_{cell}$) of the individual affected (i.e., shorted) unit cell. The FISC power of all unit cells of the cell connected in parallel is given by:

$$\dot{q}_{cell} = \frac{V^2}{R_s + R_{bl}/n} \quad (2)$$

Adding in the current limiters 206, each of which has a nonzero resistance ($R_{cld}$) results in a FISC power for a shorted unit cell given by:

$$\dot{q}_{FISC} = \frac{V^2}{R_s + \left[R_{bl}^{-1} + \left(R_{cld} + \frac{R_{bl} + R_{cld}}{n-1}\right)^{-1}\right]^{-1}} \quad (3)$$

The resistance $R_{cld}$ of each current limiter 206 is selected such that the FISC power $\dot{q}_{FISC}$ of for a shorted unit cell is less than the power minimum for occurrence of thermal runaway ($\dot{q}_{tr}$) or other maximum power considerations chosen due to battery design constraints.

The required resistance of the current limiters 206 may also be viewed from the perspective of the resistance needed to limit the current through a shorted unit cell below a threshold current that is sufficient to cause thermal runaway. Thus, by knowing the voltage produced by each unit cell, the capacity of each unit cell, the internal resistance of each unit cell, the resistance of the electrode busbar 208, and the resistance of the counter-electrode busbar 210, a resistance for the current limiters 206 can be calculated that will limit a current through the shorted unit cell to less than the threshold current needed to cause thermal runaway. The threshold current needed to cause thermal runaway may vary somewhat depending on the construction of the electrode assembly and the capacity of the individual unit cells, but for similarly constructed electrode assemblies, the threshold current will remain relatively constant. In the example embodiment, the threshold current is about 8 amps. In other embodiments, the threshold current may be about 4 amps, about 8 amps, about 10 amps, about 12 amps, or between 8 amps and 12 amps. The resistance needed for the current limiters 206 will vary depending on the specific configuration of the battery and its components. For similar electrode assemblies, the resistance needed to limit the current below the threshold current will generally increase as the capacity of the individual unit cells increases.

More specifically, the capacity of traditional stack battery cells is subdivided into a number of electrode unit cells (N) where each positive and negative electrode forms a voltage (V). The number of unit cells in a complete stack is represented by the capital letter N, while the number of unit cells as a variable, for example when performing an iterative assay with different numbers of unit cells, is represented by the lowercase letter n. Each individual electrode unit cell has its own characteristic resistance ($R_{bl}$) which is a function of conductivity and geometry of the unit cell assembly. Each individual unit cell is capable of discharging a current ($I_{bl}$) across a forced internal short circuit (FISC) resistance ($R_s$). The FISC current of an individual unit cell is given by $$I_{bl} = \frac{V}{R_s + R_{bl}} \quad (4)$$

When positive and negative electrodes of each unit cell are connected in parallel through their respective current collecting terminals with their own characteristic resistance ($R_t$), all unit cells of the cell contribute current ($I_{cell}$) discharging across the FISC of an individual affected unit cell. The FISC current of all unit cells of the cell connected in parallel is given by:

$$I_{cell} = \frac{V}{R_s + \left[R_{bl}^{-1} + \left(R_t + \frac{R_{bl}}{N-1}\right)^{-1}\right]^{-1}} \quad (5)$$

In at least some cases, the characteristic resistance of an individual unit cell is low enough that the current it is capable of discharging across a FISC is sufficient to exceed a thermal runaway current ($I_{tr}$), which is a current that may be sufficient to cause self-accelerating exothermic decomposition and thermal runaway. When multiple electrode unit cells are mutually connected through shared terminals, discharge current across the FISC of an individual affected unit cell is increasingly likely to exceed the thermal runaway current ($I_{tr}$) and result in catastrophic failure of the cell.

The resistance of each current limiter 206 is selected to be sufficient to limit the current that may pass through any individual unit cell below the thermal runaway current ($I_{tr}$). The resistance of each current limiter ($R_{cld}$) is determined as a resistance that will satisfy:

$$\frac{V_{TOC}}{R_{s,WCFISC} + \left[R_{bl}^{-1} + \left(R_{cld} + R_t + \frac{R_{bl} + R_{cld}}{N-1}\right)^{-1}\right]^{-1}} < I_{tr} \quad (6)$$

where $V_{TOC}$ is the voltage of a unit cell at top of charge, and $R_{s,WCFISC}$ is equivalent to the impedance of the unit cells in an assembly without a current limiting device in a worst case forced internal short circuit at the top of charge in an assembly of N unit cells. In the example, the worst case is considered to occur when the resistance of the forced internal short circuit is approximately equal to the resistance of the shorted unit cell. The impedance is used because the current changes very rapidly upon occurrence of a short circuit. In one embodiment, $R_{s,WCFISC}$ is the impedance at 20 kHz. Thus, the resistance $R_{s,WCFISC}$ may be described by:

$$R_{s,WCFISC} = R_{20kHz}(V_{TOC}, N) \quad (7)$$

Other embodiments may use impedance at any other frequency or a direct current resistance. In some embodiments, the actual short circuit resistance of a shorted unit cell is calculated and used in equation (6) instead of the worst case internal short circuit resistance $R_{s,WCFISC}$. As used herein, the short circuit resistance $R_s$ can refer to either the actual, measured short circuit resistance of a unit cell or the worst case internal short circuit resistance $R_{s,WCFISC}$, unless otherwise specified. An example method for determining the actual short circuit resistance is provided below.

The resistance of an individual unit cell is determined by the impedance at top of charge further considering the number of unit cell subdivisions and the resistance of the terminals calculated based on their material composition and geometry. For the example using the 20 kHz impedance, the resistance of a unit cell is given by:

$$R_{bl} = \frac{R_{20kHz}(V_{TOC}, N)}{N} - R_t \quad (8)$$

In the example embodiment, the thermal runaway current ($I_{tr}$) to be used in equation (6) above is determined by performing a worst case forced internal short circuit assay that is described below. In other embodiments, the thermal runaway current ($I_{tr}$) may be estimated, derived from simulations, determined using a different assay, or arrived at through any other suitable methods. However determined, the thermal runaway current ($I_{tr}$) is then used in equation (6) to determine the resistance needed in the current limiter ($R_{cld}$) to satisfy the inequality. By selecting providing current limiters 206 with the resistance $R_{cld}$, the current limiters 206 will effectively limit the current through any unit cell to less than the thermal runaway current ($I_{tr}$), even in the event of an internal short circuit in a unit cell.

For the example embodiment, the resistance of each current limiter 206 at 25 degrees Celsius (° C.) is about 0.25 ohms (Ω) and limits the short circuit current to less than about 8 amps. This results in a 20 mV or less voltage drop across each current limiter 206 when the electrode assembly 200 is charging or discharging at a 1 C rate. In other embodiments, the resistance of each current limiter 206 is between 0.25Ω and 2.5Ω. In some embodiments, the resistance of each current limiter 206 is between 0.1Ω and 1.5Ω. These ranges provide a range of resistances that balance the need to limit the current during a short circuit while also limiting losses during normal operation of the battery. The exact value within the ranges, as well as which range is to choose, may be selected based on the voltage, capacity, or other characteristics of the particular battery. More generally, in some embodiments, the resistance of each current limiter 206 is determined by selecting a resistance that produces a voltage drop of less than 0.5 volts when the electrode assembly 200 (or an individual unit cell) is charging or discharging at a 1 C rate when discharged from a top of charge (TOC) condition. That is, the current at the 1 C rate time the resistance of the current limiter 206 is less than 0.5 volts to minimize losses during normal operation while still sufficiently limiting current during a short circuit.

The current limiters 206 are positioned on the electrode busbar 208 in the example embodiment. The current limiters are physically positioned between the electrode current collectors 214 and the electrode busbar 208. In other embodiments, the current limiters 206 may be electrically between the electrode current collectors 214 and the electrode busbar 208, but physically outside of the connection between the electrode current collectors 214 and the electrode busbar 208.

Figure 4A:
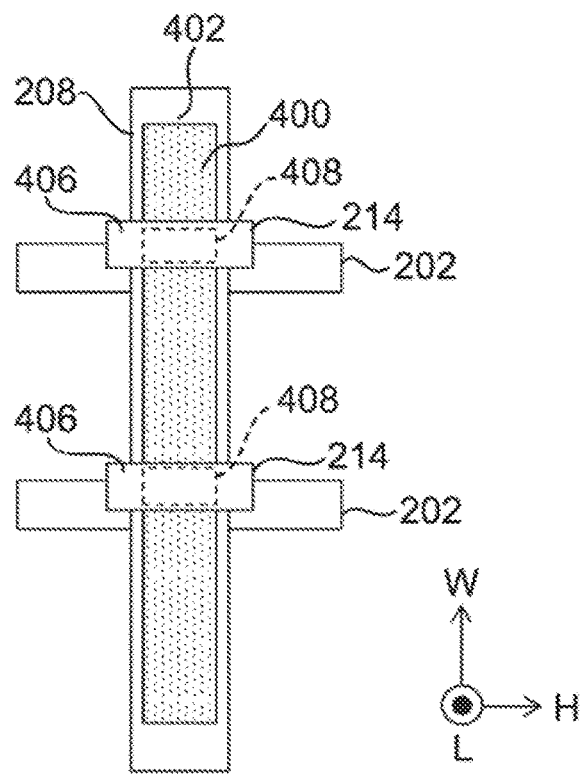
FIG. 4A is a top view of a pair of electrode structures of the electrode assembly of FIG. 2 with their current collectors attached to a busbar through current limiters.
Figure 4B:
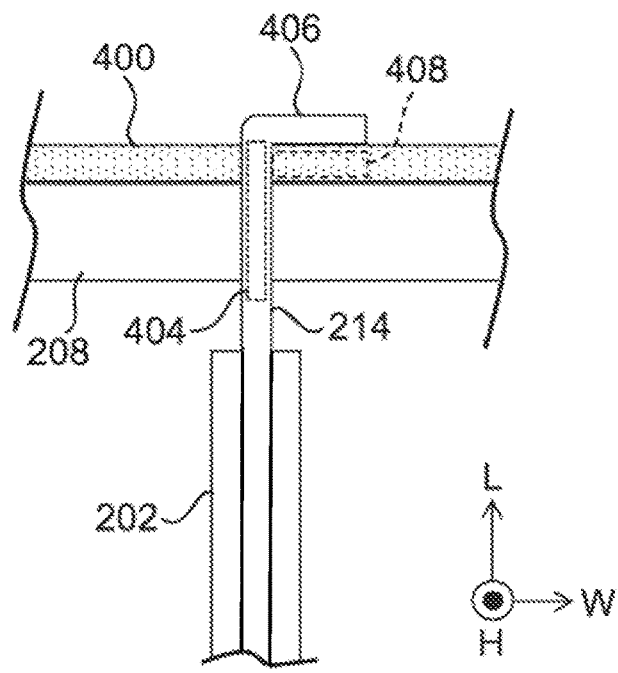
FIG. 4B is a side view one of the electrode structures of FIG. 4A with its current collector attached to the busbar through a current limiter.

Referring now to FIGS. 4A and 4B, the example current limiters 206 are comprised of a unitary layer 400 of a conductive adhesive disposed on the surface 402 of the electrode busbar 208 to which the electrode current collectors 214 will be welded. The electrode current collectors 214 include a slot 404 (FIG. 4B) and a portion 406, similar to the slot 300 and the portion 302 of the counter-electrode current collector 218 shown in FIGS. 3A and 3B, which are similarly used to connect the electrode current collectors 214 to the electrode busbar 108. Each individual current limiter 206 is a portion 408 of the unitary layer 400 located between the portion 406 of the current collector that is bent over and welded to the electrode busbar 208. In other embodiments, the conductive adhesive is applied on the electrode busbar 208 in individual portions, one for each electrode current collector 214 that will be connected to the electrode busbar 208. For example, the conductive adhesive is applied to the electrode busbar 208 around the location of the portion 406 over which the electrode current collector will be positioned when the portion 406 is bent over the electrode busbar. Each application of the conductive adhesive, and thus each current limiter 206, is physically separate from each other application of the conductive adhesive. In other embodiments, the conductive adhesive of the current limiters 206 is applied to each electrode current collector 214; such that the conductive adhesive will be positioned around the location of the portion 406 in FIG. 4B, and each current limiter 206 will be physically separated from the other current limiters 206. In other embodiments, the busbars are connected to the current collectors by any other suitable connective arrangement (e.g., without using a slot, with the busbar on top of the ends of the current collectors, etc.), with the conductive adhesive is positioned between the current collectors and the busbar(s).

Figure 18:
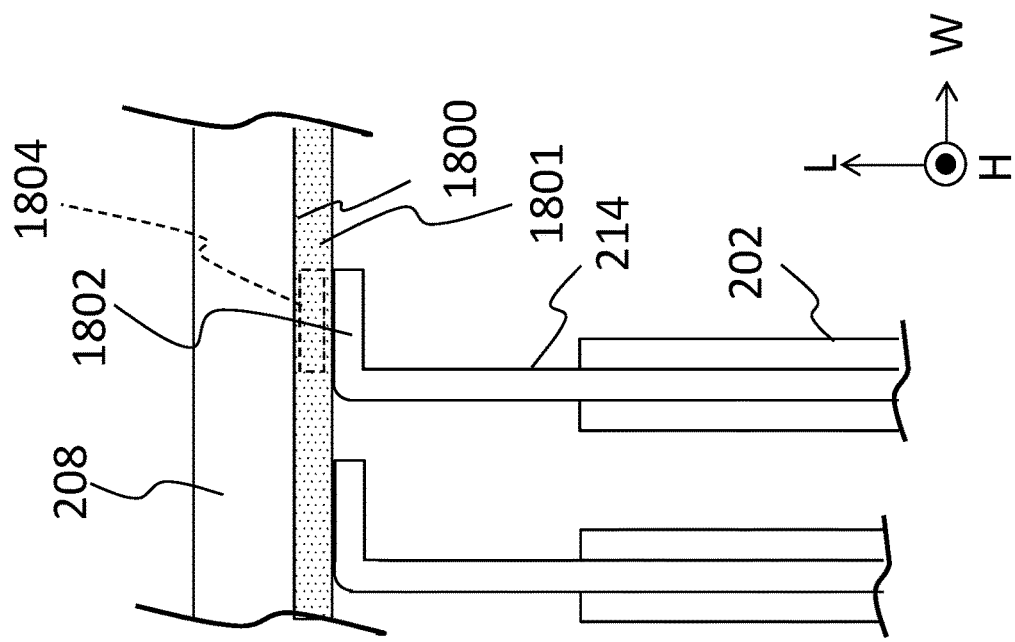
FIG. 18 is a side view of one of an electrode structure with its current collector attached to the busbar through a current limiter formed as a unitary layer without the use of a slot in the current collector.

FIG. 18 illustrates another example embodiment in which the example the electrode current collectors 214 do not include the slot 300. The current limiters 206 are comprised of a unitary layer 1801 of a conductive adhesive disposed on the bottom surface 1800 of the electrode busbar 208 to which the electrode current collectors 214 will be attached. A portion 1802 of the electrode current collector 214 is bent to approximately a ninety degree angle and the electrode busbar 208 is positioned over the portion 1802. It should be understood that the portion 1802 need not be bent to exactly ninety degrees and may be generally perpendicular to the rest of the current collector. The electrode busbar 208 is then attached to the portion 1802 of the electrode current collector 214, such as by gluing, welding, soldering, or using any other suitable technique for joining the electrode current collectors 214 to the electrode busbar 208. In an example embodiment, the electrode busbar 208 is attached to the portion 1802 by hot pressing the electrode busbar to soften the conductive adhesive and applying pressure to the busbar to adhere the electrode busbar 208 to the portion 1802 using the conductive adhesive. Although illustrated butted against the conductive adhesive, it should be understood that portions 1802 of the current collectors may extend into the conductive adhesive. Each individual current limiter 206 is a portion 1804 of the unitary layer 1801 located between the portion 1802 of the current collector that is bent over and attached to the electrode busbar 208. In other embodiments, as shown for example in FIG. 19, the conductive adhesive is applied on the electrode busbar 208 in individual portions 1900, one for each electrode current collector 214 that will be connected to the electrode busbar 208. For example, the conductive adhesive is applied to the electrode busbar 208 around the location of the portion 1802 over which the electrode current collector will be positioned when the portion 1802 is bent over the electrode busbar. Each application of the conductive adhesive, and thus each current limiter 206, is physically separate from each other application of the conductive adhesive. In other embodiments, the conductive adhesive of the current limiters 206 is applied to each electrode current collector 214, such that the conductive adhesive will be positioned around the location of the portion 1802, and each current limiter 206 will be physically separated from the other current limiters 206.

In still other embodiments, a resistor other than a conductive adhesive is used for the current limiters 206. For example, a conductive film having the desired resistance may be applied in a unitary strip to the electrode busbar 208, applied in individual portions to the electrode busbar, or applied in individual portions to each electrode current collector 214 in manners similar to the conductive adhesive. Alternatively, a non-adhesive conductive polymer may be applied in place of the conductive adhesive. Further, in some embodiments, discrete resistors may be electrically connected between the electrode current collectors 214 and the electrode busbar 208. The discrete resistors may be physically located between the electrode current collectors 214 and the electrode busbar 208, or may be physically outside of the interface between the electrode current collectors 214 and the electrode busbar 208, but electrically between the electrode current collectors 214 and the electrode busbar 208. The discrete resistors may be any suitable resistor, including wire wound resistors, thick film resistors, thin film resistors, carbon film resistors, carbon pile resistors, metal film resistors, foil resistors, or the like.

Figure 15:
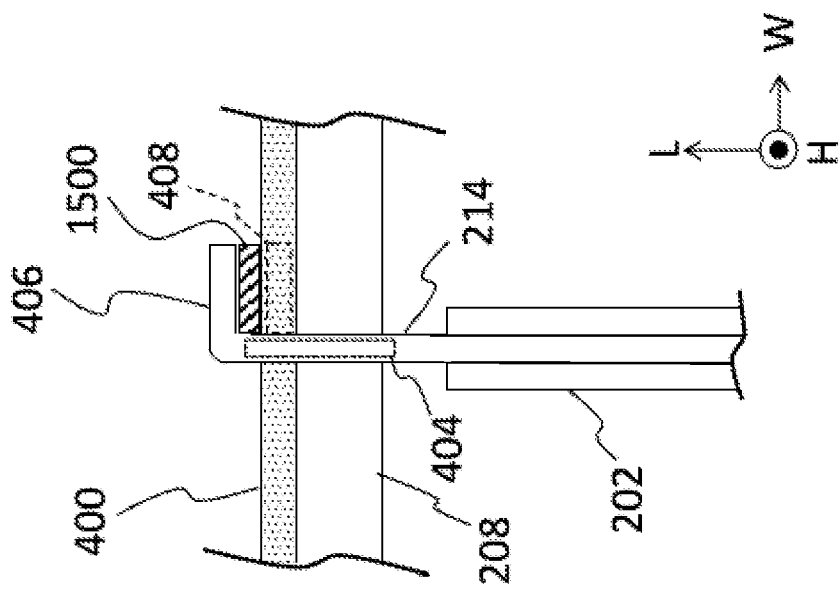
FIG. 15 is a side view an electrode structure with its current collector attached to a busbar through a current limiter and an interface layer applied to applied to electrode current collector.
Figure 14:
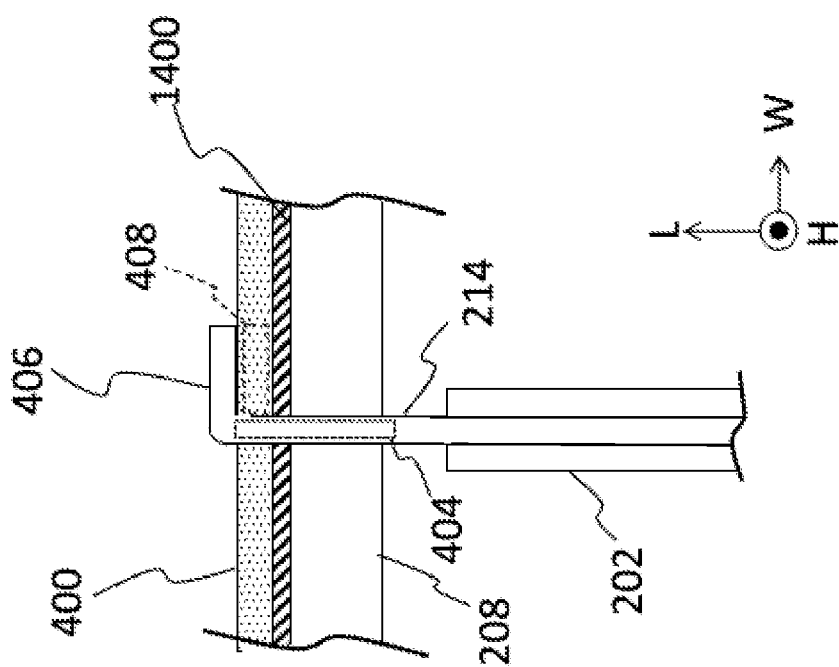
FIG. 14 is a side view an electrode structure with its current collector attached to a busbar through a current limiter and an interface layer applied to the busbar.
Figure 16:
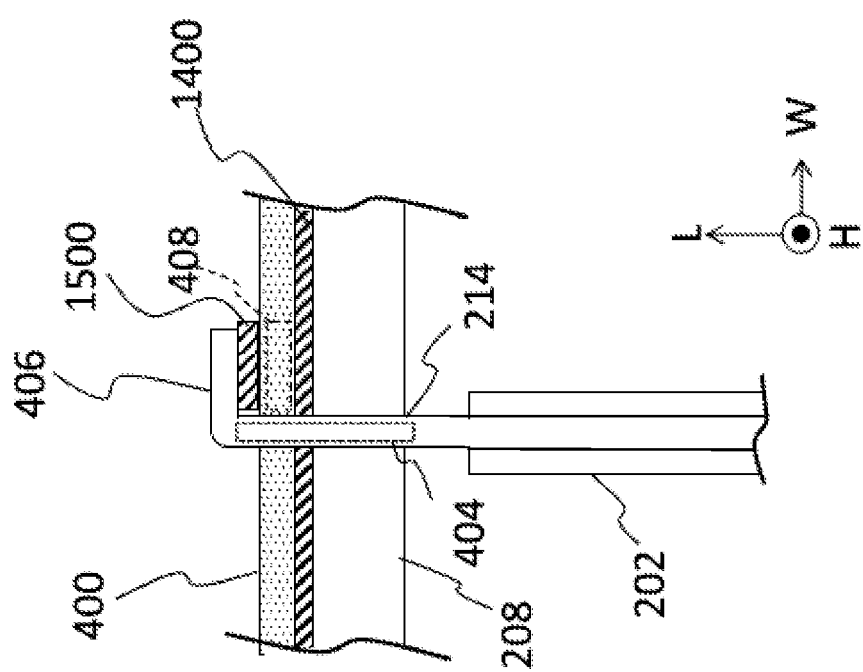
FIG. 16 is a side view an electrode structure with its current collector attached to a busbar through a current limiter, an interface layer applied to the current electrode current collector, and an interface layer applied to the busbar.

In some embodiments, one or more interface layers are included between the current limiters 206 and the electrode busbar 208 or between the current limiters 206 and the electrode current collectors 214. In general, the resistance between the electrode busbar 208 and each electrode current collector 214 is defined by the resistance of the current limiter 206, plus the resistance of the interface between the current limiter 206 and the electrode current collector 214, plus the resistance of the interface between the current limiter 206 and the electrode busbar 208. Generally, the interface resistances may be produced by imperfect (e.g., "real" connections rather than "ideal") electrical connection between the current limiter 206 and the electrode busbar 208 and the electrode current collector 214. Without being limited to any particular theory, the imperfect electrical connection may be caused by, for example, microscope structural variations of the surface of the electrode busbar 208 and/or electrode current collector 214, the distribution and structure of conductive particles in the current limiter 206, and the like. The interface layer is provided to improve the electrical connection between these components to reduce the series resistance of the electrical connection between the current limiter 206, the electrode busbar 208, and the electrode current collector 214. Referring now to FIGS. 14-16, embodiments similar to that shown in FIG. 4B is shown. Similar reference numbers in FIGS. 14-16 refer to similar components in FIG. 4B. In FIG. 14, an interface layer 1400 is applied to the electrode busbar 208. In FIG. 15, an interface layer 1500 is applied to electrode current collector 214. The interface layer 1500 may be applied to each current collector 214, or less than all current collectors

214. In FIG. 16, interface layer 1400 is applied to the electrode busbar 208 and interface layer 1500 is applied to electrode current collector 214.

In some embodiments, the interface layers 1400 and 1500 are carbon based coatings. For example, the interface layers 1400 and/or 1500 may be coatings produced by slurry coating carbon nanotubes onto the electrode busbar 208 and/or the electrode current collector 214. In other embodiments, the interface layers are graphite coatings or any other suitable electrically conductive coating. In some embodiments, the interface layers 1400 and/or 1500 are applied using a hot anvil approach in which heat is applied to the electrode busbar 208 and/or the electrode current collector 214 to coat the electrode busbar 208 and/or the electrode current collector 214 with the selected materials to form the interface layers 1400 and/or 1500.

The conductive adhesive used in the current limiters 206 in the example embodiment is an adhesive polymer, copolymer, or blend with a conductive material suspended therein. In the example embodiments, the conductive adhesive is a thermoplastic material. In other embodiments, the conducive adhesive is a thermoset material. The adhesive polymer is substantially nonconducting (e.g., insulating) prior to suspension of the conductive material therein. Generally, desirable polymers are any that are (a) stable in the environment of a Li-ion battery cell (i.e. do not dissolve in the electrolytes, react with electrolyte components or any other battery components, or undergo redox chemistry or reactions that degrade the material during cell operation) and (b) have melting points above the typical working temperature of a Li-ion battery. Because adhesion is an important property of the conductive adhesive, polymers that exhibit adhesive qualities are desirable as at least one component of the conductive adhesive. Flexibility in the polymer is another desirable trait. Therefore, materials or blends of materials with some elasticity and particularly with a glass transition temperature (Tg) above 0° C. are preferred, but not required. In some embodiments, the conductive adhesive is a polymer blend with at least one component with a high elasticity (measured by standard methods such as modulus and/or elongation to break. In some embodiments, the adhesive polymer is a flowable adhesive polymer. In such embodiments, the conductive adhesive should have flow properties that allow for melt processing, including compounding of conductive aids and other additives if desired, film/sheet preparation by standard methods such as cast film, blown film, and calendering. For example, the melt flow index (I2, 190° C., ASTM D1238) of the polymer blend used for the conductive adhesive should be in the range of 0.1 to 1000 grams (g)/10 minutes (min), preferably 0.1 to 100 g/10 min, most preferably 0.5 to 20 g/10 min. Melting points of the polymers used in the conductive adhesive should allow for melt processing and bonding to the cell via a melt press or related technique, and should be above the typical working temperature range of the cell. Polymers that melt from 40° C. to 300° C. may be used for the conductive adhesive. Polymers with a melting point in the range of 60° C. to 200° C. are preferred, polymers with a melting point in the range of 70° C. to 165° C. are most preferred.

Example suitable adhesive polymers or copolymers for use in the conductive adhesive include EAA (ethylene-co-acrylic acid) and EMAA (ethylene-co-methacrylic acid), ionomers of the EAA or EMAA, polyethylene and copolymers thereof (such as, ethylene/1-octene, ethylene/1-hexene, ethylene/1-butene, and ethylene/propylene copolymers), polypropylene and copolymers thereof, a functionalized or derivatized polyethylene or polypropylene (such as, maleic anhydride grafted materials), or the like.

The conductive material suspended in the polymer to form the conductive adhesive may be any powder, fiber, particle, or the like that confers the desired conductivity to the conductive adhesive after compounding with the polymer blend. Most desirable are materials that confer the desired conductivity at lower loadings, because high loading of additives may change the properties of the polymer blend in undesirable ways. For example, high loadings may lead to a significant decrease in melt processability, impacting the ability to manufacture films or sheets of conductive polymer using conventional equipment. In addition, conductive additives are often expensive materials, and lower loadings are desirable to maintain a lower cost for manufacturing.

The conductive material may be metal powder or fiber, conductive carbon black, metal coated carbon fiber, and carbon nanotubes, or blends thereof. In various embodiments, the conductive material may be carbon black, nickel particles, copper particles, gold particles, silver particles, tin particles, titanium particles, graphite particles, molybdenum particles, platinum particles, chromium particles, aluminum particles, or any other metallic particles, including alloys. Preferable conductive materials for use in the conductive adhesive are metal coated carbon fibers and conductive carbon blacks, or blends thereof. The metal coated carbon fibers may be coated in nickel, copper, gold, silver, tin, titanium, molybdenum, platinum chromium, aluminum, or any other metallic coating, including alloys. In a most preferred example, the conductive materials include nickel coated carbon fibers and "superconductive" carbon blacks (examples include but are not limited to Nouryon Ketjenblack EC 300-J and EC 600-JD materials, Orion Printex XE2B, Cabot Vulcan XCmax™ 22).

For embodiments in which the conductive material is a fiber (such as a nickel coated carbon fiber), the conductive material will generally have an elongated shape. It is preferable in such embodiments for the fibers to have a relatively large aspect ratio (length to diameter). In one example embodiment, nickel coated carbon fibers used as the conductive material in the conductive adhesive have an aspect ratio of about 850:1. Other useful aspect ratios for conductive materials are from 10:1 to 10,000:1, preferably 50:1 to 5000:1, and most preferably 100:1 to 2000:1.

Loading of conductive material into the polymer to form the conductive adhesive may be in the range of 1% to 50% conductive material (as weight percent of the total mixture). Preferably the loading of conductive material is from 2% to 40%, and most preferably the loading is from 3% to 30%.

The resistivity of the conductive adhesive should be in the range of $5.0 \times 10^{-7}$ and $5.0 \times 10^3$ Ω-cm, preferably from $5.0 \times 10^{-5}$ and $5.0 \times 10^1$ Ω-cm, and most preferably from $5.0 \times 10^{-3}$ and $5.0 \times 10^{-1}$ Ω-cm. The polymer resistivity is measured by making a sheet or film of the polymer blend with conductive additive(s), then laminating that sheet or film to a copper test structure consisting of four rectangular bars adhered adjacent to one another in an array with defined interspacing. Lamination may be accomplished using methods such as a hot press or heated calender. Once lamination is complete, the resistivity measurement is accomplished using a typical four-point probe method, where the source probes apply a current through the sheet of film by contacting the two outermost bars and the sense probe measures the potential between the innermost bars allowing for determination of the bulk resistivity when the geometry of the four-point test structure array and thickness of the sheet or film is defined.

In an example embodiment, the conductive material is carbon black. The conductive adhesive is formed by mixing carbon black in the adhesive polymer until the adhesive polymer has a volume resistivity of between about 0.01 and 1.0 Ω-cm. The resistivity can be adjusted by adjusting the amount of carbon black added to the adhesive polymer. Adding more carbon black will decrease the resistivity (i.e., make it more conductive), and adding less carbon black will increase the resistivity (i.e., make it less conductive). In the example embodiment, carbon black is added to the adhesive polymer in an amount between 5% to 30% by weight to achieve the desired resistivity. The conductive adhesive so prepared is applied to the electrode busbar 208 at a thickness of between 20 microns and 200 microns thick. By adjusting the resistivity of the adhesive polymer and the thickness of application, the desired resistance for the current limiters 206 may be achieved.

Figure 5:
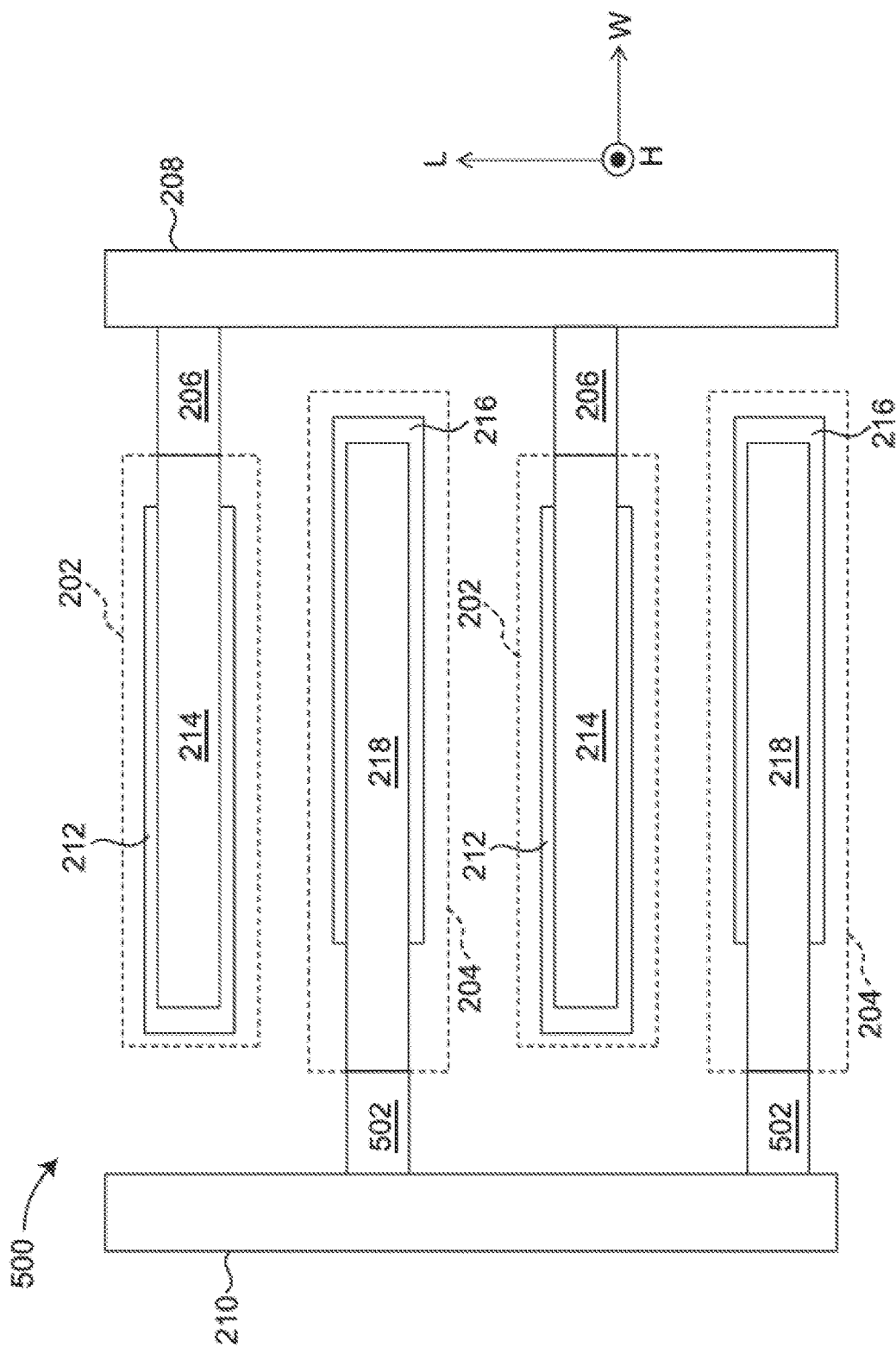
FIG. 5 is a simplified diagram of another example electrode assembly for cycling between a charged state and a discharged state in a secondary battery.

FIG. 5 is a simplified diagram of another example electrode assembly 500 for cycling between a charged state and a discharged state in a battery. The electrode assembly 500 is similar to the electrode assembly 200, and the same reference numbers are used to identify common components. For clarity of illustration, the separator structures 205 are not shown in FIG. 5, but are included in this example electrode assembly 500. Unlike the electrode assembly 200, the electrode assembly 500 includes a population of additional current limiters 502. The additional current limiters 502 are each electrically connected between a different one of the counter-electrode current collectors 218 and the counter-electrode busbar 210. In some embodiments, the additional current limiters 502 are the same as the current limiters 206 discussed above, and the connections are made in the same ways as the current limiters 206. However, in some embodiments, the additional current limiters 502 have a different composition and/or are different from the current limiters 206. For example, a conductive film may be used as the resistance for the additional current limiters 502, while a conductive adhesive is used in the current limiters 206. Alternatively, one type of conductive adhesive may be used in the current limiters 206, and a different type of conductive adhesive may be used in the additional current limiters 502. This may be especially useful when the counter-electrode busbar 210 and the electrode busbar 208 are made of different materials that may adhere to different conductive adhesives differently. As another example, the additional current limiters 502 may use different conductive materials suspended in the conductive adhesive than the current limiters 206. Further, in some embodiments, the additional current limiters 502 have a different resistance than the current limiters 206. In particular embodiments, the additional current limiters 502 have a resistance that is less than the resistance of the current limiters 206, including having a resistance of less than 0.25Ω, when the resistance of the current limiter 206 is sufficient to limit current below a threshold which would lead to a catastrophic failure.

Figure 6:
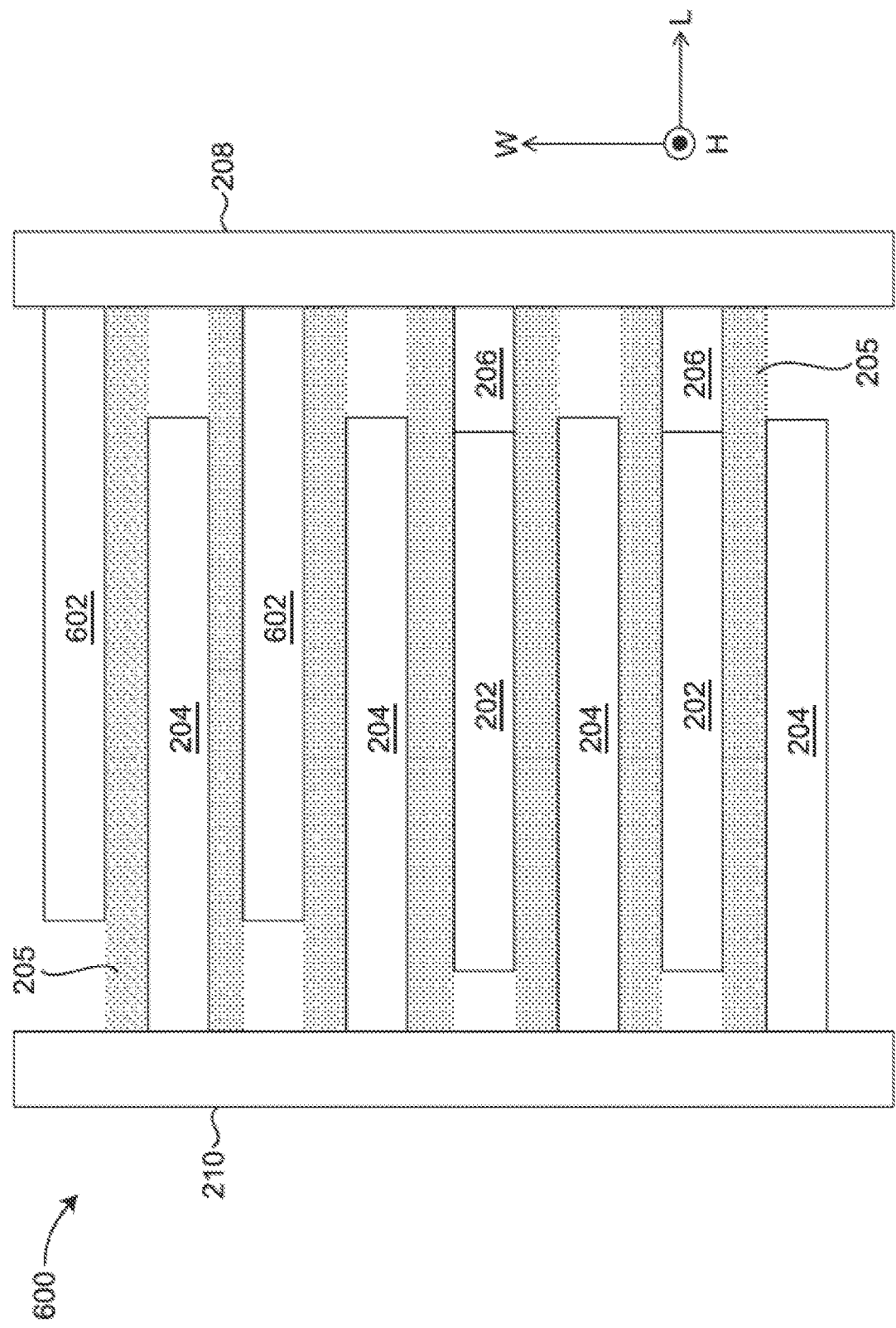
FIG. 6 is a simplified diagram of yet another example electrode assembly for cycling between a charged state and a discharged state in a secondary battery.

FIG. 6 is a simplified diagram of another example electrode assembly 600 for cycling between a charged state and a discharged state in a battery. The electrode assembly 600 is similar to the electrode assembly 200, and the same reference numbers are used to identify common components. Some details of the electrode structures 202 and the counter electrode structures 204 are removed for clarity of illustration, but all aspects of the electrode structures 202 and the counter electrode structures 204 discussed above are the same in the electrode assembly 600. Unlike the electrode assembly 200, the electrode assembly 600 includes a population of additional electrode structures 602 that are connected directly to the electrode busbar 208. That is, the additional electrode structures 602 are connected to the electrode busbar 208 without a current limiter 206.

Figure 7:
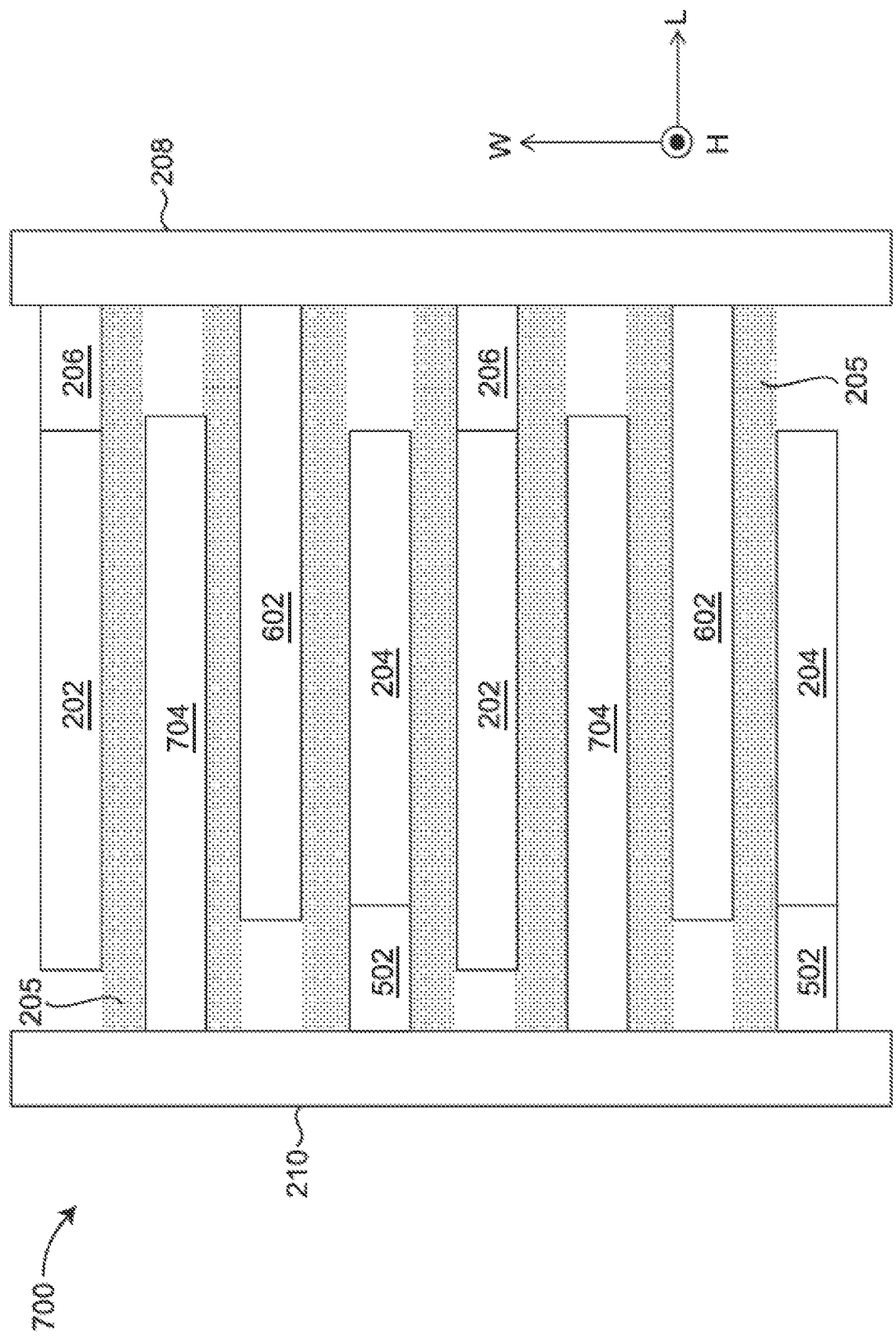
FIG. 7 is a simplified diagram of still another example electrode assembly for cycling between a charged state and a discharged state in a secondary battery.

FIG. 7 is a simplified diagram of another example electrode assembly 700 for cycling between a charged state and a discharged state in a battery. The electrode assembly 700 is similar to the electrode assembly 500, and the same reference numbers are used to identify common components. Some details of the electrode structures 202 and the counter electrode structures 204 are removed for clarity of illustration, but all aspects of the electrode structures 202 and the counter electrode structures 204 discussed above are the same in the electrode assembly 700. Unlike the electrode assembly 500, the electrode assembly 500 includes the population of additional electrode structures 602 and a population of additional counter-electrode structures 704 that are all connected directly to the electrode busbar 208. That is, the additional electrode structures 602 and the additional counter-electrode structures 704 are connected to the electrode busbar 208 without a current limiter 206 or an additional current limiter 502.

Figure 9:
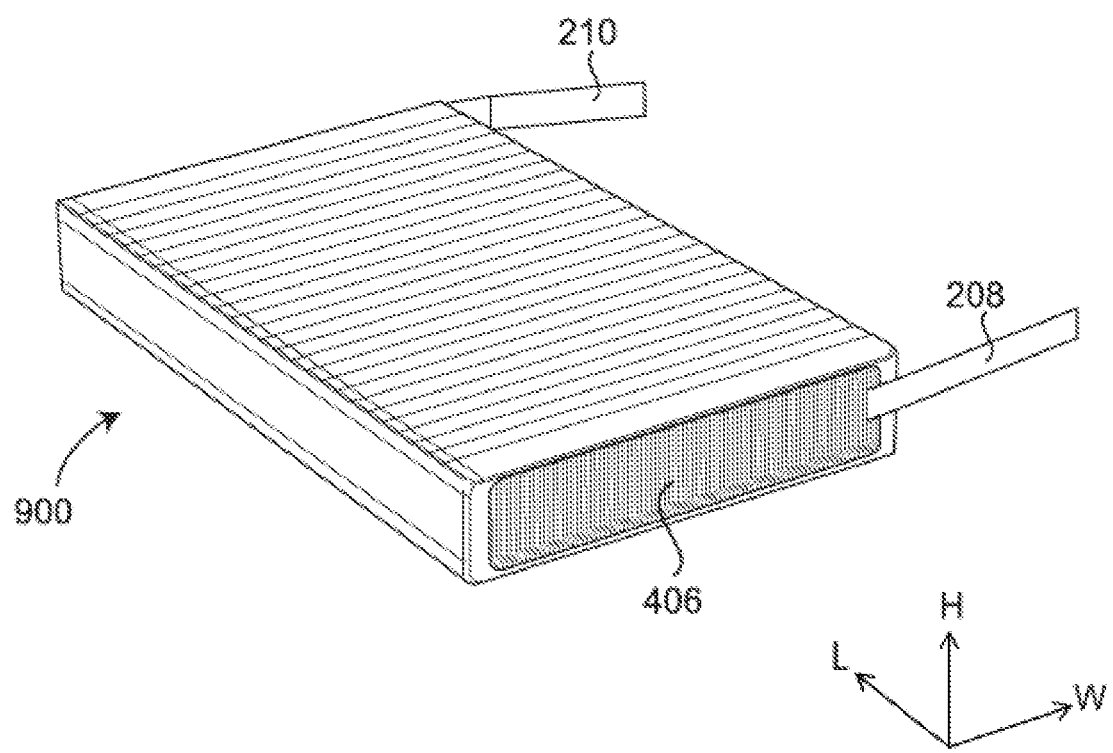
FIG. 9 is an isometric view of an example stacked cell created as part of the manufacture of a secondary battery.

FIG. 9 is an example stacked cell 900 created as part of the manufacture of a secondary battery. To form a secondary battery, an electrode assembly, such as the electrode assembly 200, 500, 600, or 700 is first assembled. Electrode structures 202, counter-electrode structures 204, and (if applicable) additional electrode structures 602 and/or additional counter-electrode structures 704 are assembled. The formed electrode, counter-electrode, additional electrode, and additional counter-electrode structures 202, 204, 602, 704 will be referred to as "electrode sub-units" in the following paragraphs. A predetermined number of electrode sub-units are stacked in a stacking direction (e.g., in the width direction in FIG. 2) with separators 205 to form the multi-unit electrode stack. Generally, at least ten electrode structures 202 and at least ten counter-electrode structures 204 are included in the multi-unit electrode stack. In some embodiments at least twenty electrode structures 202 and at least twenty counter-electrode structures 204 are included in the multi-unit electrode stack. Other embodiments may include any suitable number of electrode structures 202 and at least ten counter-electrode structures 204 in the multi-unit electrode stack. The multi-unit electrode stack is then placed in a pressurized constraint having pressure plates that apply pressure to the multi-unit electrode stack to adhere all of the electrode sub-units together.

In the multi-unit electrode stack, the electrode structure and the counter-electrode structure extend in a longitudinal direction perpendicular to the stacking direction (e.g., in the length direction in FIG. 2). An end portion (for example the portion of the electrode current collector 214 extending above the rest of the electrode structure 202 in FIGS. 4B, 14, 15, 16, 18, and 19) of the electrode current collector extends past the electrode active material and the separator structure in the longitudinal direction. The end portion that extends above the electro active material and the separator structure is bent to be approximately perpendicular to the longitudinal direction of the electrode structure and to extend in the stacking direction or opposite the stacking direction, as shown in FIGS. 4B, 14, 15, 16, 18, and 19. In the embodiments without a slot (e.g., FIGS. 18 and 19), the end portion is bent before the electrode busbar is positioned extending in the stacking direction with a surface of the electrode busbar in contact with the end portions (that is the bent end portion) of the electrode current collectors. In an exemplary embodiment, a conductive adhesive layer (e.g., conductive adhesive discussed herein and functioning as a current limiting device) is located between the surface of the electrode busbar and the end portions of the electrode current collectors. In some embodiments, the conductive adhesive layer is disposed on the surface of the electrode busbar in contact with the electrode current collectors. In other embodiments, the conductive adhesive layer is disposed on the electrode current collectors. In still other embodiments, the conductive adhesive layer is a separate layer positioned between the electrode busbar and the electrode current collectors. Heat and pressure are applied to the electrode busbar to adhere the end portions of the electrode current collectors to the busbar through the conductive adhesive layer. The heat applied may be from 100° C. to 300° C., preferably 125° C. to 250° C., and most preferably from 150° C. to 225° C. The pressure may be from 10 psi to 1000 psi, preferably from 15 psi to 750 psi, and more preferably 20 psi to 500 psi.

In the embodiments using a slot in the current collector (e.g. FIGS. 4B and 14-16), the busbar is inserted through the slots before the current collector is bent. In such embodiments, the electrode busbar 208 and the counter-electrode busbar 210 are placed through the slots 404, 300 (shown in FIGS. 3A-4B) of the respective current collectors 214, 218 with the current limiters 206 (and if applicable 502) between the busbars 208, 210 and the current collectors 214, 218. Once the busbars 208, 210 have been placed through the slots 404, 300 the portions 406, 302 are folded down toward their respective busbars 208, 210 respectively. The electrode busbar 208 is welded to the portion 406 of the electrode current collector 214, and the counter-electrode busbar 210 is welded to the portion 302 of the counter-electrode current collector 218. The welds may be made using a laser welder, friction welding, ultrasonic welding or any suitable welding method for welding busbars 208, 210 to the current collectors 214, 218. After welding of the busbars to the multi-unit electrode stack, the stacked cell 900 is complete, and may be placed in a battery formed pouch, metal can, or other suitable container. In other embodiments, any other suitable method of connecting the electrode busbar 208 and the counter-electrode busbar 210 to the current collectors may be used, including methods without slots, attaching the busbars on top of tabs on the current collectors, and the like.

Figure 10:
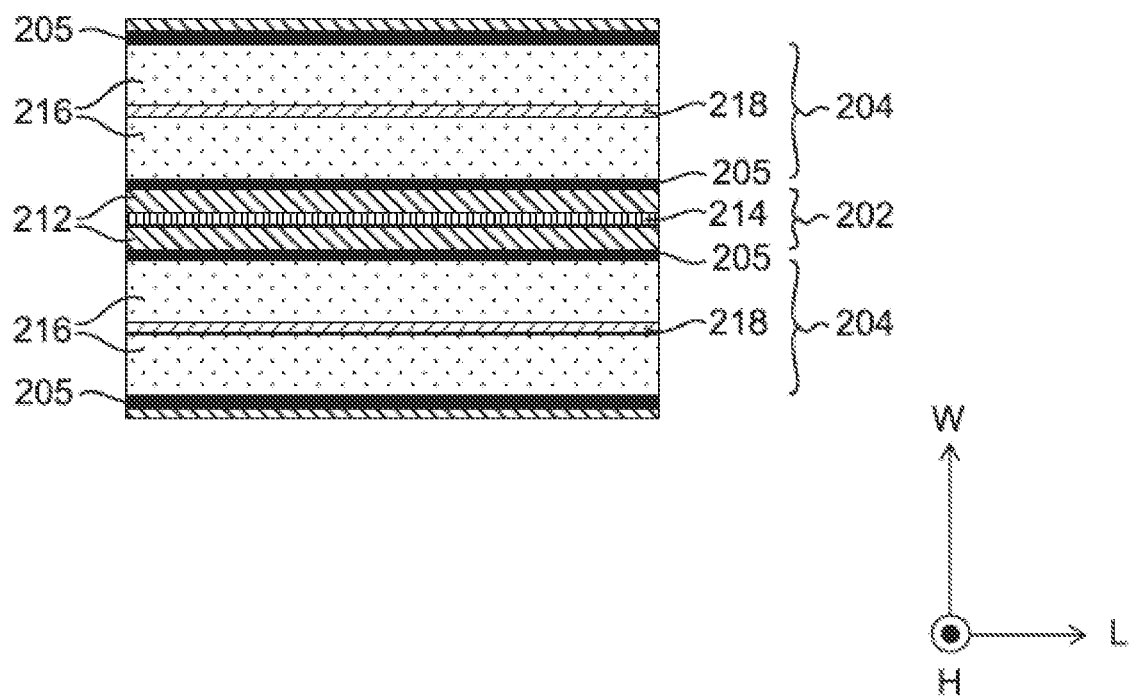
FIG. 10 is a portion of a top view of the stacked cell shown in FIG. 9.

FIG. 10 is a portion of a top view (i.e. as viewed from the height direction H) of the stacked cell 900. The portion of the stacked cell 900 shown in FIG. 9 includes one electrode structure 202 and two counter-electrode structures 204. In this example, the electrode structure 202 is the anode electrode structure, and the counter-electrode structures 204 are the cathode electrode structures.

Figure 11A:
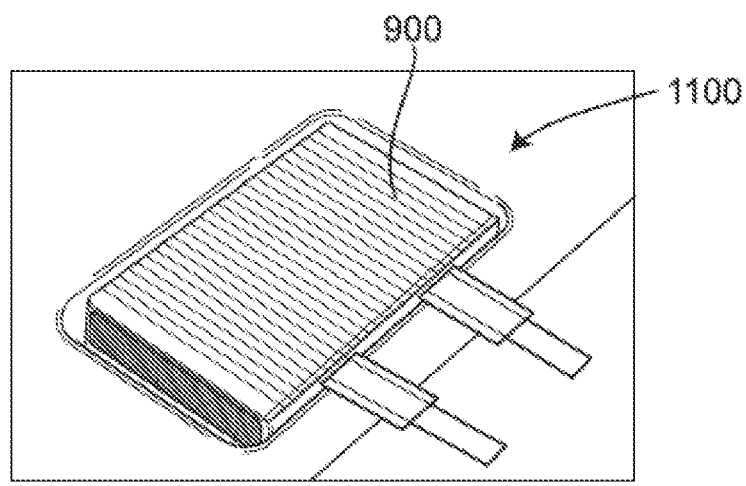
FIG. 11A is an isometric view of the stacked cell shown in FIG. 9 positioned at a packaging station.
Figure 11B:
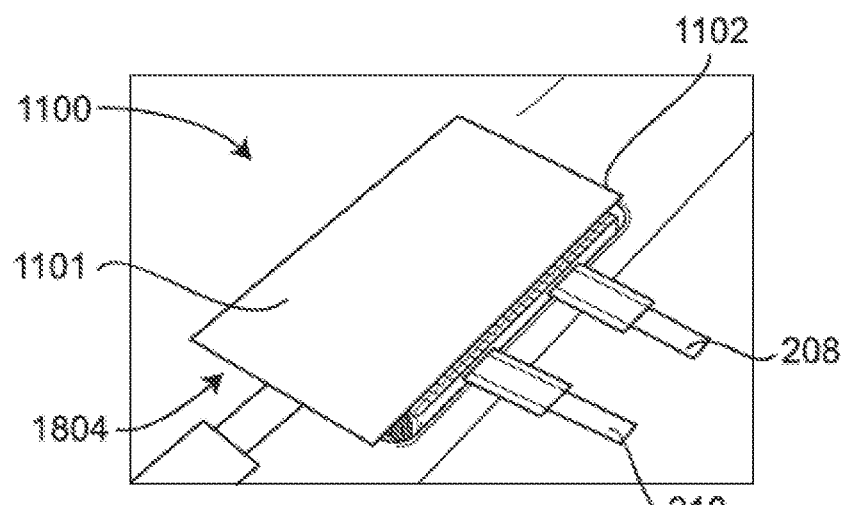
FIG. 11B is an isometric view of the stacked cell shown in FIG. 11A with a battery package placed thereon.

With reference to FIGS. 11A and 11B, after formation of the stacked cell 900, the stacked cell 900 proceeds to a packaging station 1100, where the stacked cell 900 is coated with an insulating packaging material 1101, such as a multi-layer aluminum polymer material, plastic, or the like, to form a battery package 1102. In one embodiment, the battery package 1102 is evacuated using a vacuum and filled through an opening (not shown) with an electrolyte material. The insulating packaging material may be sealed around stacked cell 900 using a heat seal, laser weld, adhesive or any suitable sealing method. After sealing, the battery insulated packing material forms a sealed enclosure. The ends of the busbars 208 and 210 remain exposed, and are not covered by battery package 1102, and the exposed ends function as an electrode terminal and a counter-electrode terminal external to the sealed battery enclosure. The exposed ends of the busbar allow a user to connect the busbars to a device to be powered or to a battery charger. In other embodiments separate external electrode and counter-electrode terminals are welded to the busbars 208 and 210 and are positioned external to the sealed battery package 1102. In some embodiments, the connection between such external electrode and counter-electrode terminals is located within the battery package 1102, and the ends of the busbars 208, 210 do not extend outside of the battery package 1102.

Figure 12:
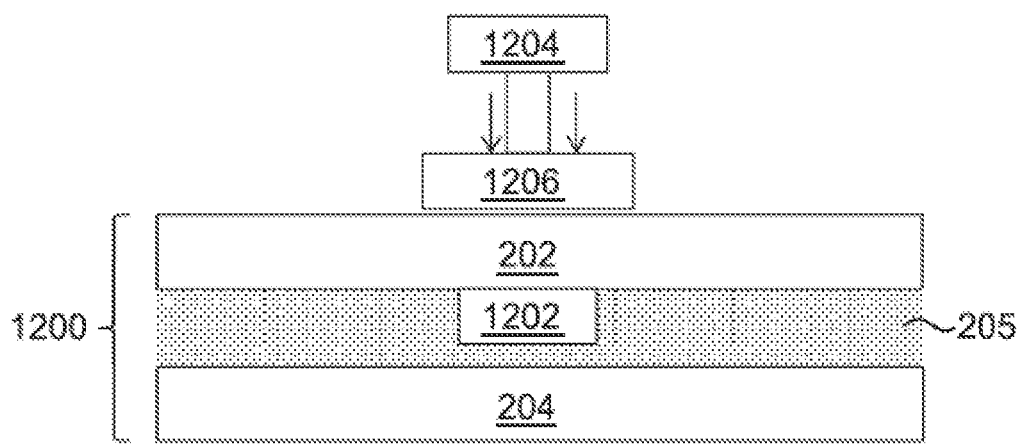
FIG. 12 is a simplified diagram of a unit cell of an electrode assembly being tested in a forced internal short circuit test.

Referring now to FIG. 12, a wet (i.e., the unit cells include a liquid electrolyte) forced internal short circuit (FISC) assay used to determine the thermal runaway current ($I_{tr}$) used in equation (6) may be performed. The FISC assay is an iterative test. The test is performed on an electrode assembly including n unit cells (where n is a positive integer). Each unit cell includes a single electrode structure 202 adjacent a single counter electrode 204 with a separator 205 between them and including a current limiter 206. The first iteration is performed with an electrode assembly where n=1 (i.e., there is a single unit cell) that is electrically disconnected from any other electrode structures 202, 204. FIG. 12 shows the electrode assembly to be tested including the single unit cell 1200. Note that FIG. 12 is not to scale. To perform the test, a conductive particle 1202 is positioned in the area between the unit cell's fully-charged positive and negative electrodes (e.g., on the separator structure 205 between the electrode structure 202 and the counter-electrode structure 204). In one example, the conductive particle 1202 is a 2 mm×0.2 mm×0.1 mm L-shaped nickel particle. In other embodiments, the conductive particle 1202 may have any other suitable shape and/or may be made of any other suitable conductive material. A servo-motor 1204 press displaces a 5 mm×5 mm flat acrylic resin indenter 1206 at a speed of 1.0 mm/s onto the unit cell 1200 at the location where the embedded conductive particle is located. This causes the conductive particle 1202 to electrically connect the electrode structure 202 and the counter-electrode structure 204 in a short circuit. The servo-motor 1204 continues to displace the indenter 1206 until a voltage drop of more than 80% of the unit cell's voltage has occurred. If the unit cell 1200 experiences catastrophic failure (e.g., the unit cell 1200 catches fire or explodes), the test is stopped. If a single unit cell 1200 fails the test, the configuration of the failed unit cell is not a candidate for use of this test to determine the thermal runaway current ($I_{tr}$), and a different test, estimation, simulation, etc. must be performed to determine the thermal runaway current ($I_{tr}$) for this configuration of a unit cell 1200. Moreover, if the single unit cell 1200 fails the test, the configuration of the failed unit cell may not be a good candidate for use with the current limiters described herein, because the resistance needed for the current limiters in order to suitably limit the current will likely be high enough to incur undesirable energy losses under normal charging and discharging.

If the unit cell 1200 does not experience catastrophic failure, the unit cell 1200 configuration passes the first iteration, n is incremented by 1, and a new assembly including a two unit cells (i.e., n=2) is assembled, with one of the unit cells being configured with the conductive particle 1202 as discussed above for the first step. The FISC test is repeated for this new assembly with two unit cells. If the new assembly passes the test, the above steps in this paragraph are performed again. That is, a new assembly with n=n+1 unit cells is assembled with one of the unit cells including the conductive particle, and the FISC test is performed again. The worst case forced internal short circuit resistance is given in each step by:

$$R_{s,WCFISC}(n) = R_{20kHz(Vtoc,n)} \qquad (9)$$

In this example, the 20 kHz impedance is used, but the impedance at any other suitable, nonzero frequency may be used. This iteration repeats until an electrode assembly fails the test. Once one of the electrode assemblies fails the test, the test is stopped. The number of unit cells from the last successful iteration (i.e., the electrode assembly having the current value of n−1 unit cells) is used to determine the thermal runaway current ($I_{tr}$). The thermal runaway current ($I_{tr}$) is given by:

$$I_{tr} = \frac{V_{TOC}}{2R_{20kHz}(V_{TOC}, n-1)} \quad (10)$$

The thermal runaway current ($I_{tr}$) determined from equation (10) is then used in inequality (6) to determine the resistance needed for each current limiter 206, and an electrode assembly may be produced including the current limiters 206 each having the determined resistance.

Although discussed above beginning with a single unit cell and n=1, the above assay may begin with any suitable, non-zero number of unit cells. For example, if it is expected (e.g., estimated, calculated, or the like) that a particular unit cell configuration will fail the test at n=4, the test may be begun at n=3 with an electrode assembly including three unit cells.

The actual short circuit resistance for use as $R_s$ in equation (6) may be determined using a dry FISC assay. The dry FISC assay is similar to the FISC assay discussed above, but is performed on one or more unit cells. In the dry FISC assay, one or more unit cells without any electrolyte is subjected to a FISC using the assembly and techniques described above with reference to FIG. 12. That is, the unit cell (including a single electrode structure 202 adjacent a single counter electrode 204 with a separator 205) has a conductive particle 1202 positioned in the area between the unit cell's positive and negative electrodes (e.g., on the separator structure 205 between the electrode structure 202 and the counter-electrode structure 204), and the indenter 1206 crushes the unit cell to cause the conductive particle 1202 to electrically connect the electrode structure 202 and the counter-electrode structure 204 in a short circuit. The actual short circuit resistance of the shorted unit cell is then measured and may be used in equation (6).

Figure 13:
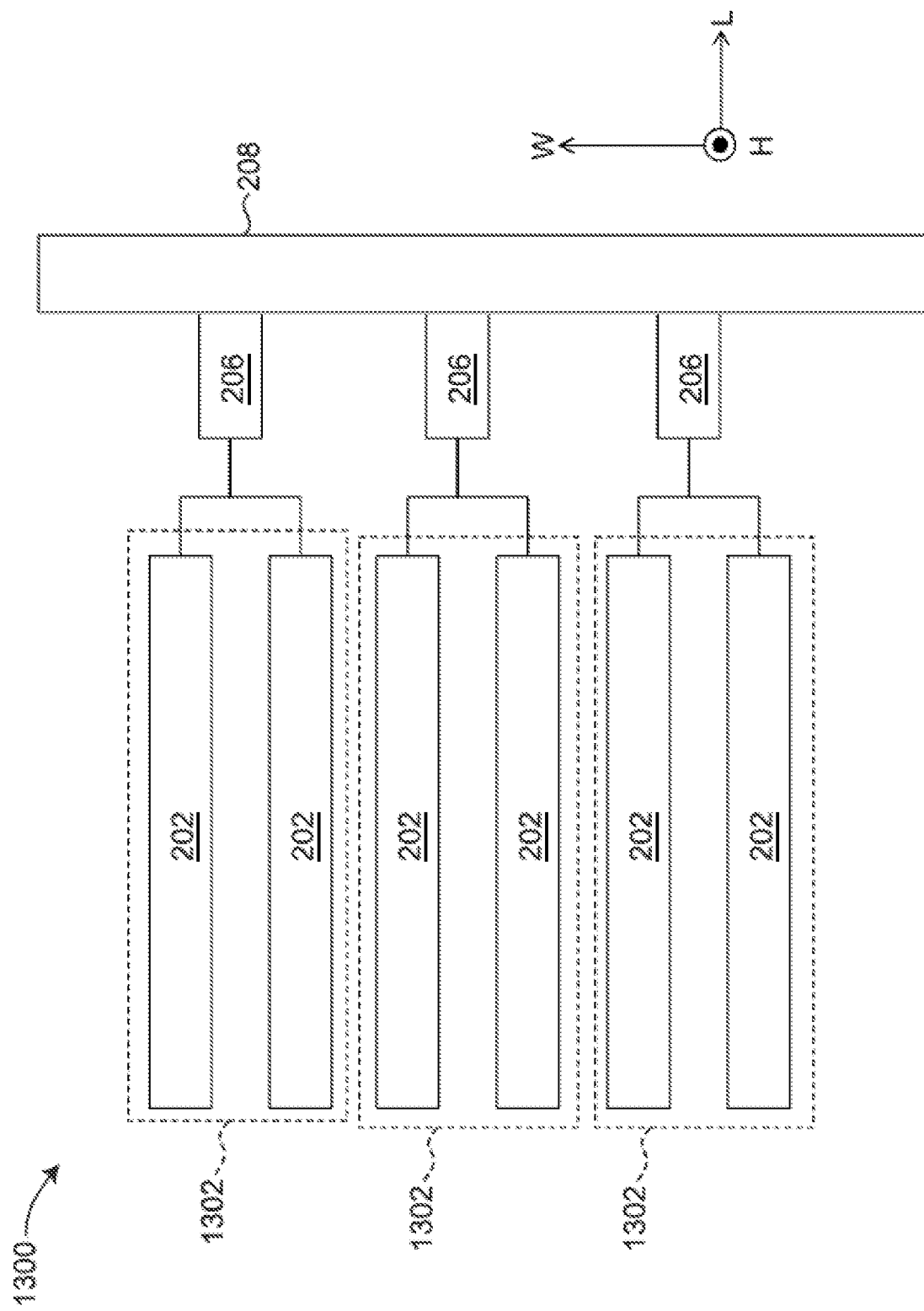
FIG. 13 is a simplified diagram of a portion of another example electrode assembly for cycling between a charged state and a discharged state in a secondary battery.

FIG. 13 is a simplified diagram of a portion of another electrode assembly 1300 for cycling between a charged state and a discharged state in a battery. The electrode assembly 1300 includes similar components to the electrode assemblies described above, and the components are the same unless otherwise specified. The population of counter-electrode structures, the population of separator structures, and the counter-electrode busbar are omitted from the figure for clarity. The population of current limiters 206 in the electrode assembly 1300 has fewer members than the population of electrode structures 202. The population of electrode structures is divided into groups 1302 of electrode structures 202. Each group 1302 of electrode structures 202 includes two electrode structures 202 in FIG. 13. In other embodiments, the groups 1302 may include any number of electrode structures 202, as long as the group includes more than one electrode structure 202. Each electrode structure 202 in a group 1302 is electrically connected to the other electrode structures 202 in its group 1302 in parallel. The parallel connection of electrode structures 202 in a group 1302 is connected to the electrode busbar 208 by a single current limiter 206. That is, all of the electrode structures in a group 1302 share a single current limiter 206. Other embodiments may additionally or alternatively include a similar grouped arrangement of counter-electrode structures 204 sharing a single current limiter 206. Moreover, in some embodiments, some of the electrode structures 202 and/or some of the counter-electrode structures 204 in the electrode assembly may be grouped as described above, while other electrode structures 202 and/or counter-electrode structures 204 in the assembly are not grouped and each have their own current limiter 206.

The resistance of the current limiters 206 in the electrode assembly 1300 is determined by a variation of inequality (6) discussed above. Specifically, the resistance of the shared current limiters 206 in the electrode assembly 1300 is determined to satisfy:

$$\frac{V_{TOC}}{R_{s,WCFISC} + \left[\left(\frac{R_{bl}}{n}\right)^{-1} + \left(R_{cld} + R_t + \frac{R_{bl} + R_{cld}}{N-n}\right)^{-1}\right]^{-1}} < I_{Tr} \quad (11)$$

where n is the number of unit cells (or the number of electrode structures 202) in a group 1302.

In some embodiment, the resistance of the current limiters 206 is defined by a relationship between the resistance of the current limiter and a cell resistance of unit cells. Specifically, within a range of normal operating temperatures between negative 30 degrees Celsius (° C.) and 80° C., each unit cell has a cell resistance R1. Each current limiter has a resistance R2 such that:

$$R2/R1 > 0.01 \quad (12)$$

when the electrode assembly is within the range of normal operating temperatures. The exact value of the ratio of R2/R1 may vary depending on the capacity and/or voltage of the battery. In example embodiments R2/R1 is approximately equal to 0.5, 0.95, or 0.0275. In some embodiments, R2/R1 may be greater than 0.1, greater than 0.5, greater than 0.95, or greater than 0.1.

The following embodiments are provided to illustrate aspects of the disclosure, although the embodiments are not intended to be limiting and other aspects and/or embodiments may also be provided.

Embodiment 1. An electrode assembly for cycling between a charged state and a discharged state, the electrode assembly comprising a population of electrode structures, a population of counter-electrode structures, a population of current limiters, an electrode busbar, and a counter-electrode busbar. Each member of the electrode structure population comprises an electrode active material and an electrode current collector, the electrode current collectors comprised by the electrode structure population members being electrically connected, in parallel, to the electrode busbar. Each member of the counter-electrode structure population comprises a counter-electrode active material and a counter-electrode current collector, the counter-electrode current collectors comprised by the counter-electrode structure population members being electrically connected, in parallel, to the counter-electrode busbar. The population of current limiters comprises at least ten current limiters. Each of the electrode current collectors is electrically connected to the electrode busbar by a member of the population of current limiters, wherein at a temperature of 25 degrees Celsius (C) each member of the current limiter population has a resistance greater than or equal to 0.25 ohms (Ω).

Embodiment 2. An electrode assembly for cycling between a charged state and a discharged state includes a population of electrode structures, each member of the electrode structure population comprising an electrode active material and an electrode current collector, an electrode busbar, the electrode current collector of each member of the electrode structure population being electrically connected, in parallel, to the electrode busbar, a population of counter-electrode structures, each member of the counter-electrode structure population comprising a counter-electrode active material and a counter-electrode current collector, a counter-electrode busbar, the counter-electrode current collector of each member of the counter-electrode structure population being electrically connected, in parallel, to the counter-electrode busbar, and a population of current limiters. Each member of the current limiter population electrically connecting the electrode current collector of each member of the electrode structure population to the electrode busbar, wherein at a temperature of 25 degrees Celsius (° C.) each member of the current limiter population has a resistance greater than or equal to 0.25 ohms (Ω).

Embodiment 3. An electrode assembly for cycling between a charged state and a discharged state includes a population of electrode structures, a population of counter-electrode structures, a population of separator structures for electrically isolating the electrode structure population and the counter-electrode structure population, a population of current limiters, an electrode busbar, and a counter-electrode busbar. Each member of the electrode structure population comprises an electrode active material and an electrode current collector, the electrode current collectors comprised by the electrode structure population members being electrically connected, in parallel, to the electrode busbar. Each member of the counter-electrode structure population comprises a counter-electrode active material and a counter-electrode current collector, the counter-electrode current collectors comprised by the counter-electrode structure population members being electrically connected, in parallel, to the counter-electrode busbar. Each member of the current limiter population is electrically connected between a different electrode current collector and the electrode bus bar, wherein at a temperature of 25 degrees Celsius (° C.) each member of the current limiter population has a resistance greater than 0.25 ohms (Ω).

Embodiment 4. An electrode assembly for cycling between a charged state and a discharged state includes a population of electrode structures, a population of counter-electrode structures, a population of separator structures for electrically isolating the electrode structure population and the counter-electrode structure population, a population of current limiters, an electrode busbar, and a counter-electrode busbar. Each member of the electrode structure population comprises an electrode active material and an electrode current collector, the electrode current collectors comprised by the electrode structure population members being electrically connected, in parallel, to the electrode busbar. Each member of the counter-electrode structure population comprises a counter-electrode active material and a counter-electrode current collector, the counter-electrode current collectors comprised by the counter-electrode structure population members being electrically connected, in parallel, to the counter-electrode busbar. Each member of the current limiter population is positioned between a different electrode current collector and the electrode bus bar and electrically connected to its associated electrode current collector and the electrode bus bar, wherein at a temperature of 25 degrees Celsius (° C.) each member of the current limiter population has a resistance greater than 0.25 ohms (Ω).

Embodiment 5. An electrode assembly for cycling between a charged state and a discharged state includes a population of electrode structures, a population of counter-electrode structures, a population of separator structures for electrically isolating the electrode structure population and the counter-electrode structure population, a population of current limiters, an electrode busbar, and a counter-electrode busbar. The electrode assembly has a fully-charged capacity, C at 25 C, a current threshold $I_{Th}$ that may cause failure of the electrode assemble, and a voltage difference V exists between electrode structure population members and counter-electrode structure population members. The electrode structure population members each have an electrode structure resistance and comprise an electrode active material and an electrode current collector, the electrode current collectors comprised by the electrode structure population members being electrically connected, in parallel, to the electrode busbar. Each member of the counter-electrode structure population comprises a counter-electrode active material and a counter-electrode current collector, the counter-electrode current collectors comprised by the counter-electrode structure population members being electrically connected, in parallel, to the counter-electrode busbar. Each member of the current limiter population is electrically connected between a different electrode current collector and the electrode bus bar, wherein at a temperature of 25 degrees Celsius (° C.) each member of the current limiter population has a resistance that limits a current through its associated electrode structure population member to less than $I_{Th}$, and the resistance determined as a function of V, the electrode structural resistance of the associated electrode structure population member, a resistance of a short circuit between the associated electrode structure population member and a member of the counter-electrode structure population, and a number of electrode structure population members connected to the electrode busbar.

Embodiment 6. The electrode assembly of Embodiment 5, wherein $I_{Th}$ is greater than or equal to 8 amps and less than or equal to 12 amps.

Embodiment 7. The electrode assembly of Embodiment 5 or Embodiment 6, wherein $I_{Th}$ is 8.0 amps.

Embodiment 8. The electrode assembly of any of Embodiments 5-7, wherein V is 4.35 volts.

Embodiment 9. An electrode assembly for cycling between a charged state and a discharged state includes a population of electrode structures, a population of counter-electrode structures, a population of separator structures for electrically isolating the electrode structure population and the counter-electrode structure population, a population of current limiters, an electrode busbar, and a counter-electrode busbar. The electrode assembly has a fully-charged capacity, C at 25 degrees Celsius (° C.). Each member of the electrode structure population comprises an electrode active material and an electrode current collector, the electrode current collectors comprised by the electrode structure population members being electrically connected, in parallel, to the electrode busbar. Each member of the counter-electrode structure population comprises a counter-electrode active material and a counter-electrode current collector, the counter-electrode current collectors comprised by the counter-electrode structure population members being electrically connected, in parallel, to the counter-electrode busbar. The population of current limiters is located in the electrical connections between the electrode busbar and each electrode current collector of the electrode population members, wherein at a temperature of 25° C. (i) each member of the current limiter population includes a resistance that limits the amount of electrical current that may flow between the electrode busbar and its associated electrode current collector to a maximum of 8 amps, and (ii) the voltage drop across each member of the current limiter population does not exceed 20 mV when electrical current is passed between the electrode busbar and each member of the electrode current collector subset to charge or discharge the electrode assembly at a C-rate of 1 C.

Embodiment 9.1. An electrode assembly for cycling between a charged state and a discharged state within a range of normal operating temperatures between negative 30 degrees Celsius (° C.) and 80° C., the electrode assembly comprising a population of unit cells, an electrode busbar, a counter-electrode busbar, and a population of current limiters. Each member of the unit cell population has a cell resistance R1 and comprises an electrode structure, a separator structure, and a counter-electrode structure, wherein the electrode structure of each member of the unit cell population comprises an electrode current collector and an electrode active material layer and the counter-electrode structure of each member of the unit cell population comprises a counter-electrode current collector and a counter-electrode active material layer. For each member of the unit cell population, (a) the electrode current collector of the electrode structure is electrically connected to the electrode busbar, (b) the counter-electrode current collector of the counter-electrode structure is electrically connected to the counter-electrode busbar, and (c) a member of the current limiter population is electrically connected between (i) the electrode current collector and the electrode busbar or (ii) the counter-electrode current collector and the counter-electrode busbar. Each member of the current limiter population has a resistance R2 such that R2/R1>0.01 when the electrode assembly is within the range of normal operating temperatures.

Embodiment 9.2. An electrode assembly for cycling between a charged state and a discharged state within a range of normal operating temperatures between negative 20 degrees Celsius (° C.) and 80° C., the electrode assembly comprising a population of unit cells, a population of current limiters, an electrode busbar, and a counter-electrode busbar. Each member of the unit cell population comprises an electrode structure, a separator structure, and a counter-electrode structure, wherein the electrode structure of each member of the unit cell population comprises an electrode current collector and an electrode active material layer and the counter-electrode structure of each member of the unit cell population comprises a counter-electrode current collector and a counter-electrode active material layer. For each member of the unit cell population, (a) the electrode current collector of the electrode structure is electrically connected to the electrode busbar, (b) the counter-electrode current collector of the counter-electrode structure is electrically connected to the counter-electrode busbar, and (c) at least one member of the current limiter population is electrically connected between (i) the electrode current collector and the electrode busbar or (ii) the counter-electrode current collector and the counter-electrode busbar. For each unit cell, the at least one member of the current limiter population has a resistance when the electrode assembly is within the range of normal operating temperatures sufficient to substantially continuously limit a current through the unit cell to a nonzero current less than a threshold current I that is less than a current that would induce thermal runaway of the unit cell until the electrode assembly is discharged.

Embodiment 10. The electrode assembly of any of Embodiments 5-9.2, wherein the resistance of each member of the current limiter population at a temperature of 25 degrees Celsius (° C.) is greater than 0.25 ohms (Ω).

Embodiment 11. The electrode assembly any of Embodiments 3-10, wherein the resistance of each member of the current limiter population does not increase at temperatures above 25° C.

Embodiment 12. The electrode assembly of any of Embodiments 1-11, wherein the population of current limiters comprises a conductive adhesive.

Embodiment 13. The electrode assembly of Embodiment 12, wherein the conductive adhesive is comprised of a unitary layer of a conductive adhesive, and each member of the population of current limiters comprises a different portion of the unitary layer of conductive adhesive.

Embodiment 14. The electrode assembly of Embodiment 13, wherein the unitary layer of conductive adhesive is disposed on the electrode busbar.

Embodiment 15. The electrode assembly of Embodiment 12, wherein the conductive adhesive of each member of the population of current limiters is physically separated from the conductive adhesive of each other member of the population of current limiters.

Embodiment 16. The electrode assembly of Embodiment 15 conductive adhesive is disposed on a portion of each member of the electrode current collector population.

Embodiment 17. The electrode assembly of any of Embodiments 12-16, wherein the conductive adhesive comprises an adhesive polymer having a conductive material suspended therein.

Embodiment 18. The electrode assembly of Embodiment 17, wherein the conductive material comprises carbon black.

Embodiment 18.1. The electrode assembly of Embodiment 17, wherein the conductive material comprises metal coated carbon fibers.

Embodiment 18.2. The electrode assembly of Embodiment 18.1, wherein the metal coated carbon fibers comprise carbon fibers coated with nickel.

Embodiment 18.3. The electrode assembly of Embodiment 18.1 or 18.2, wherein the metal coated carbon fibers have a length and a diameter, and an aspect ratio of the length to the diameter is equal to or greater than 10:1.

Embodiment 18.4. The electrode assembly of Embodiment 18.3, wherein the aspect ratio of the length to the diameter is between 10:1 and 10,000:1 inclusive.

Embodiment 18.5. The electrode assembly of Embodiment 18.3, wherein the aspect ratio of the length to the diameter is between 50:1 and 5,000:1 inclusive.

Embodiment 18.6. The electrode assembly of Embodiment 18.3, wherein the aspect ratio of the length to the diameter is between 100:1 and 2,000:1 inclusive.

Embodiment 18.7. The electrode assembly of Embodiment 18.3, wherein the aspect ratio of the length to the diameter is about 850.

Embodiment 19. The electrode assembly of Embodiment 17, wherein the conductive material comprises nickel particles.

Embodiment 20. The electrode assembly of Embodiment 17, wherein the conductive materials comprise one or more of carbon black, nickel, copper, gold, silver, titanium, graphite, molybdenum, chromium, and aluminum.

Embodiment 21. The electrode assembly of Embodiment 17, wherein the conductive materials comprise metallic particles.

Embodiment 22. The electrode assembly of any of Embodiments 12-21, wherein the conductive adhesive comprises a hot-melt adhesive polymer.

Embodiment 22.1. The electrode assembly of any of Embodiments 12-21, wherein a melt flow index of the conductive adhesive determined according to ASTMD 1238 at 190° C. is between 0.1 to 1000 grams (g)/10 minutes (min).

Embodiment 22.2. The electrode assembly of Embodiment 22.1, wherein the melt flow index is between 0.1 to 100 g/10 min.

Embodiment 22.3. The electrode assembly of Embodiment 22.1, wherein the melt flow index is between 0.5 to 20 g/10 min.

Embodiment 22.4. The electrode assembly of any of Embodiments 12-22.3, wherein a melting point of the conductive adhesive is between 40° C. and 300° C.

Embodiment 22.5. The electrode assembly of Embodiment 22.4, wherein the melting point of the conductive adhesive is between 60° C. and 200° C.

Embodiment 22.6. The electrode assembly of Embodiment 22.4, wherein the melting point of the conductive adhesive is between 70° C. and 165° C.

Embodiment 23. The electrode assembly of any of Embodiments 12-22.6, wherein the conductive adhesive has a resistivity greater than or equal to 0.01 Ω·cm.

Embodiment 24. The electrode assembly of any of Embodiments 12-23, wherein the conductive adhesive has a resistivity less than or equal to 1.0 Ω·cm.

Embodiment 25. The electrode assembly of any of Embodiments 12-24, wherein the conductive adhesive comprises one of ethylene-co-acrylic acid, an ionomer of ethylene-co-acrylic acid, and a polymer of ethylene-co-acrylic acid.

Embodiment 26. The electrode assembly of any of Embodiments 12-24, wherein the conductive adhesive comprises one of ethylene-co-methacrylic acid, an ionomer of ethylene-co-methacrylic acid, and a polymer of ethylene-co-methacrylic acid.

Embodiment 27. The electrode assembly of any of Embodiments 12-24, wherein the conductive adhesive comprises a functionalized polyethylene.

Embodiment 28. The electrode assembly of any of Embodiments 12-24, wherein the conductive adhesive comprises a functionalized polypropylene.

Embodiment 29. The electrode assembly of any of Embodiments 1-11, wherein each member of the current limiter population comprises a conductive film.

Embodiment 30. The electrode assembly of any of Embodiments 1-29, wherein each member of the current limiter population is physically located between the electrode bus bar and its associated electrode current collector.

Embodiment 31. The electrode assembly of any of Embodiments 1-30, further comprising an additional population of current limiters, each member of the additional population of current limiters is electrically connected between a different counter-electrode current collector and the counter-electrode bus bar.

Embodiment 32. The electrode assembly of Embodiment 31, wherein at a temperature of 25 degrees Celsius (° C.) each member of the additional current limiter population has a resistance greater than 0.25 ohms (Ω).

Embodiment 33. The electrode assembly of Embodiment 31, wherein at a temperature of 25 degrees Celsius (° C.) each member of the additional current limiter population has a resistance less than 0.25 ohms (Ω).

Embodiment 34. The electrode assembly of any of Embodiments 31-33, wherein the resistance of each member of the second current limiter population does not increase at temperatures above 25° C.

Embodiment 35. The electrode assembly of any of Embodiments 31-34, wherein the population of additional current limiters comprises an additional conductive adhesive.

Embodiment 36. The electrode assembly of Embodiment 35, wherein the additional conductive adhesive comprises an additional adhesive polymer having an additional conductive material suspended therein.

Embodiment 37. The electrode assembly of Embodiment 36, wherein the additional conductive material comprises carbon black.

Embodiment 37.1. The electrode assembly of Embodiment 36, wherein the additional conductive material comprises metal coated carbon fibers.

Embodiment 37.2. The electrode assembly of Embodiment 37.1, wherein the metal coated carbon fibers comprise carbon fibers coated with nickel.

Embodiment 37.3. The electrode assembly of Embodiment 37.1 or 37.2, wherein the metal coated carbon fibers have a length and a diameter, and an aspect ratio of the length to the diameter is equal to or greater than 10:1.

Embodiment 37.4. The electrode assembly of Embodiment 37.3, wherein the aspect ratio of the length to the diameter is between 10:1 and 10,000:1 inclusive.

Embodiment 37.5. The electrode assembly of Embodiment 37.3, wherein the aspect ratio of the length to the diameter is between 50:1 and 5,000:1 inclusive.

Embodiment 37.6. The electrode assembly of Embodiment 37.3, wherein the aspect ratio of the length to the diameter is between 100:1 and 2,000:1 inclusive.

Embodiment 37.7. The electrode assembly of Embodiment 37.3, wherein the aspect ratio of the length to the diameter is about 850.

Embodiment 38. The electrode assembly of Embodiment 36, wherein the additional conductive material comprises nickel particles.

Embodiment 39. The electrode assembly of Embodiment 36, wherein the additional conductive material comprises one or more of carbon black, nickel, copper, gold, silver, titanium, graphite, molybdenum, chromium, and aluminum.

Embodiment 40. The electrode assembly of Embodiment 36, wherein the additional conductive material comprises metallic particles.

Embodiment 41. The electrode assembly of Embodiment 36, wherein the additional conductive material and the conductive material are a same type of conductive material.

Embodiment 42. The electrode assembly of any of Embodiments 35-41, wherein the additional conductive adhesive comprises a hot-melt adhesive polymer.

Embodiment 42.1. The electrode assembly of any of Embodiments 35-41, wherein a melt flow index of the additional conductive adhesive determined according to ASTMD 1238 at 190° C. is between 0.1 to 1000 grams (g)/10 minutes (min).

Embodiment 42.2. The electrode assembly of Embodiment 42.1, wherein the melt flow index is between 0.1 to 100 g/10 min.

Embodiment 42.3. The electrode assembly of Embodiment 42.1, wherein the melt flow index is between 0.5 to 20 g/10 min.

Embodiment 42.4. The electrode assembly of any of Embodiments 35-42.3, wherein a melting point of the additional conductive adhesive is between 40° C. and 300° C.

Embodiment 42.5. The electrode assembly of Embodiment 42.4, wherein the melting point of the additional conductive adhesive is between 60° C. and 200° C.

Embodiment 42.6. The electrode assembly of Embodiment 42.4, wherein the melting point of the additional conductive adhesive is between 70° C. and 165° C.

Embodiment 43. The electrode assembly of any of Embodiments 35-42.6, wherein the additional conductive adhesive has a resistivity greater than or equal to 0.01 Ω·cm.

Embodiment 44. The electrode assembly of any of Embodiments 35-43, wherein the additional conductive adhesive has a resistivity less than or equal to 1.0 Ω·cm.

Embodiment 45. The electrode assembly of any of Embodiments 35-44, wherein the additional conductive adhesive comprises one of ethylene-co-acrylic acid, an ionomer of ethylene-co-acrylic acid, and a polymer of ethylene-co-acrylic acid.

Embodiment 46. The electrode assembly of any of Embodiments 35-44, wherein the additional conductive adhesive comprises one of ethylene-co-methacrylic acid, an ionomer of ethylene-co-methacrylic acid, and a polymer of ethylene-co-methacrylic acid.

Embodiment 47. The electrode assembly of any of Embodiments 35-44, wherein the additional conductive adhesive comprises a functionalized polyethylene.

Embodiment 48. The electrode assembly of any of Embodiments 35-44, wherein the additional conductive adhesive comprises a functionalized polypropylene.

Embodiment 49. The electrode assembly of any of Embodiments 31-34, wherein each member of the additional current limiter population comprises a conductive film.

Embodiment 50. The electrode assembly of any of Embodiments 31-49, wherein each member of the additional current limiter population is physically located between the electrode bus bar and its associated electrode current collector.

Embodiment 51. The electrode assembly of any of Embodiments 1-50, further comprising a population of additional electrode structures, each member of the population of additional electrode structures comprises the electrode active material and an additional electrode current collector, the additional electrode current collectors being electrically connected, in parallel, to the electrode busbar without being connected to a member of the current limiter population.

Embodiment 52. The electrode assembly of any of Embodiments 1-51, wherein the electrode structures comprise cathode structures, the electrode active materials comprise cathode active materials, the electrode current collectors comprise cathode current collectors, and the electrode busbar comprises a cathode busbar.

Embodiment 53. The electrode assembly of any of Embodiments 1-51, wherein the electrode structures comprise anode structures, the electrode active materials comprise anode active materials, the electrode current collectors comprise anode current collectors, and the electrode busbar comprises an anode busbar.

Embodiment 54. A secondary battery comprising a sealed battery enclosure, the electrode assembly of any of the preceding Embodiments within the sealed enclosure, and an electrode terminal and a counter-electrode terminal external to the sealed battery enclosure.

Embodiment 55. A secondary battery for cycling between a charged state and a discharged state having a rated capacity C comprising (i) a sealed battery enclosure, (ii) an electrode assembly including a population of current limiters within the sealed enclosure, and (iii) an electrode terminal and a counter-electrode terminal external to the sealed battery enclosure. The electrode assembly has mutually perpendicular transverse, longitudinal, and vertical axes corresponding to the x, y and z axes, respectively, of an imaginary three-dimensional Cartesian coordinate system and comprises (i) a population of at least 10 electrode structures and a population of at least 10 counter-electrode structures arranged in an alternating sequence in the longitudinal direction, (ii) an electrode busbar electrically connected to the electrode terminal, (iii) a counter-electrode busbar electrically connected to the counter-electrode terminal, and (iv) an electrically insulating separator material between members of the electrode and counter-electrode populations, wherein (v) each member of the electrode population is electrically connected, in parallel, to the electrode busbar, (vi) the electrode busbar has a length and a cross-sectional area, and is adapted to carry electrical current from the electrode terminal to the electrode population and to carry current that has been pooled from the electrode population to the electrode terminal, (vii) each member of the counter-electrode population is electrically connected, in parallel, to the counter-electrode busbar, and (viii) the counter-electrode busbar has a length and a cross-sectional area, and is adapted to carry electrical current from the counter-electrode terminal to the counter-electrode population and to carry current that has been pooled from the counter-electrode population to the counter-electrode terminal. Each member of the electrode population comprises an electrode current collector having a proximal end, a distal end, a length extending from the proximal to the distal end thereof, a cross-sectional area along its length, and a layer of an electrode active material on a surface of the electrode current collector, the electrode current collector proximal end being electrically and connected to the electrode busbar. Each member of the counter-electrode population comprises a counter-electrode current collector and a layer of a counter-electrode active material on a surface of the counter-electrode current collector. The population of current limiters are electrically connected between the electrode busbar and the electrode current collectors, wherein at a temperature of 25 degrees Celsius (° C.) each member of the current limiter population has a resistance greater than 0.25 ohms (Ω).

Embodiment 56. The secondary battery of Embodiment 55, wherein the resistance of each member of the current limiter population does not increase at temperatures above 25° C.

Embodiment 57. The secondary battery of Embodiment 56 or Embodiment 57, wherein the population of current limiters comprises a conductive adhesive.

Embodiment 58. The secondary battery of Embodiment 57, wherein the conductive adhesive is comprised of a unitary layer of a conductive adhesive, and each member of the population of current limiters comprises a different portion of the unitary layer of conductive adhesive.

Embodiment 59. The secondary battery of Embodiment 58, wherein the unitary layer of conductive adhesive is disposed on the electrode busbar.

Embodiment 60. The secondary battery of Embodiment 57, wherein the conductive adhesive of each member of the population of current limiters is physically separated from the conductive adhesive of each other member of the population of current limiters.

Embodiment 61. The secondary battery of Embodiment 60 conductive adhesive is disposed on a portion of each member of the electrode current collector population.

Embodiment 62. The secondary battery of any of Embodiments 57-61, wherein the conductive adhesive comprises an adhesive polymer having a conductive material suspended therein.

Embodiment 63. The secondary battery of Embodiment 62, wherein the conductive material comprises carbon black.

Embodiment 63.1. The secondary battery of Embodiment 62, wherein the conductive material comprises metal coated carbon fibers.

Embodiment 63.2. The secondary battery of Embodiment 63.1, wherein the metal coated carbon fibers comprise carbon fibers coated with nickel.

Embodiment 63.3. The secondary battery of Embodiment 63.1 or 63.2, wherein the metal coated carbon fibers have a length and a diameter, and an aspect ratio of the length to the diameter is equal to or greater than 10:1.

Embodiment 63.4. The secondary battery of Embodiment 63.3, wherein the aspect ratio of the length to the diameter is between 10:1 and 10,000:1 inclusive.

Embodiment 63.5. The secondary battery of Embodiment 63.3, wherein the aspect ratio of the length to the diameter is between 50:1 and 5,000:1 inclusive.

Embodiment 63.6. The secondary battery of Embodiment 63.3, wherein the aspect ratio of the length to the diameter is between 100:1 and 2,000:1 inclusive.

Embodiment 63.7. The secondary battery of Embodiment 63.3, wherein the aspect ratio of the length to the diameter is about 850.

Embodiment 64. The secondary battery of Embodiment 62, wherein the conductive material comprises nickel particles.

Embodiment 65. The secondary battery of Embodiment 62, wherein the conductive materials comprise one or more of carbon black, nickel, copper, gold, silver, titanium, graphite, molybdenum, chromium, and aluminum.

Embodiment 66. The secondary battery of Embodiment 62, wherein the conductive materials comprise metallic particles.

Embodiment 67. The secondary battery of any of Embodiments 57-66, wherein the conductive adhesive comprises a hot-melt adhesive polymer.

Embodiment 67.1. The secondary battery of any of Embodiments 57-66, wherein a melt flow index of the conductive adhesive determined according to ASTMD 1238 at 190° C. is between 0.1 to 1000 grams (g)/10 minutes (min).

Embodiment 67.2. The secondary battery of Embodiment 67.1, wherein the melt flow index is between 0.1 to 100 g/10 min.

Embodiment 67.3. The secondary battery of Embodiment 67.1, wherein the melt flow index is between 0.5 to 20 g/10 min.

Embodiment 67.4. The secondary battery of any of Embodiments 57-67.3, wherein a melting point of the conductive adhesive is between 40° C. and 300° C.

Embodiment 67.5. The secondary battery of Embodiment 67.4, wherein the melting point of the conductive adhesive is between 60° C. and 200° C.

Embodiment 67.6. The secondary battery of Embodiment 67.4, wherein the melting point of the conductive adhesive is between 70° C. and 165° C.

Embodiment 68. The secondary battery of any of Embodiments 57-67.6, wherein the conductive adhesive has a resistivity greater than or equal to 0.01 Ω·cm.

Embodiment 69. The secondary battery of any of Embodiments 57-68, wherein the conductive adhesive has a resistivity less than or equal to 1.0 Ω·cm.

Embodiment 70. The secondary battery of any of Embodiments 57-69, wherein the conductive adhesive comprises one of ethylene-co-acrylic acid, an ionomer of ethylene-co-acrylic acid, and a polymer of ethylene-co-acrylic acid.

Embodiment 71. The secondary battery of any of Embodiments 57-69, wherein the conductive adhesive comprises one of ethylene-co-methacrylic acid, an ionomer of ethylene-co-methacrylic acid, and a polymer of ethylene-co-methacrylic acid.

Embodiment 72. The secondary battery of any of Embodiments 57-69, wherein the conductive adhesive comprises a functionalized polyethylene.

Embodiment 73. The secondary battery of any of Embodiments 57-69, wherein the conductive adhesive comprises a functionalized polypropylene.

Embodiment 74. The secondary battery of Embodiment 55 or Embodiment 56, wherein each member of the current limiter population comprises a conductive film.

Embodiment 75. The secondary battery of any of Embodiments 55-74, wherein each member of the current limiter population is physically located between the electrode bus bar and its associated electrode current collector.

Embodiment 76. The secondary battery of any of Embodiments 55-75, wherein the electrode assembly further comprises an additional population of current limiters, each member of the additional population of current limiters is electrically connected between a different counter-electrode current collector and the counter-electrode bus bar.

Embodiment 77. The secondary battery of Embodiment 76, wherein at a temperature of 25 degrees Celsius (° C.) each member of the additional current limiter population has a resistance greater than 0.25 ohms (Ω).

Embodiment 78. The secondary battery of Embodiment 76, wherein at a temperature of 25 degrees Celsius (° C.) each member of the additional current limiter population has a resistance less than 0.25 ohms (Ω).

Embodiment 79. The secondary battery of any of Embodiments 76-78, wherein the resistance of each member of the second current limiter population does not increase at temperatures above 25° C.

Embodiment 80. The secondary battery of any of Embodiments 76-79, wherein the population of additional current limiters comprises an additional conductive adhesive.

Embodiment 81. The secondary battery of Embodiment 80, wherein the additional conductive adhesive comprises an additional adhesive polymer having an additional conductive material suspended therein.

Embodiment 82. The secondary battery of Embodiment 81, wherein the additional conductive material comprises carbon black.

Embodiment 82.1. The secondary battery of Embodiment 81, wherein the additional conductive material comprises metal coated carbon fibers.

Embodiment 82.2. The secondary battery of Embodiment 82.1, wherein the metal coated carbon fibers comprise carbon fibers coated with nickel.

Embodiment 82.3. The secondary battery of Embodiment 82.1 or 82.2, wherein the metal coated carbon fibers have a length and a diameter, and an aspect ratio of the length to the diameter is equal to or greater than 10:1.

Embodiment 82.4. The secondary battery of Embodiment 82.3, wherein the aspect ratio of the length to the diameter is between 10:1 and 10,000:1 inclusive.

Embodiment 82.5. The secondary battery of Embodiment 82.3, wherein the aspect ratio of the length to the diameter is between 50:1 and 5,000:1 inclusive.

Embodiment 82.6. The secondary battery of Embodiment 82.3, wherein the aspect ratio of the length to the diameter is between 100:1 and 2,000:1 inclusive.

Embodiment 82.7. The secondary battery of Embodiment 82.3, wherein the aspect ratio of the length to the diameter is about 850.

Embodiment 83. The secondary battery of Embodiment 81, wherein the additional conductive material comprises nickel particles.

Embodiment 84. The secondary battery of Embodiment 81, wherein the additional conductive material comprises one or more of carbon black, nickel, copper, gold, silver, titanium, graphite, molybdenum, chromium, and aluminum.

Embodiment 85. The secondary battery of Embodiment 81, wherein the additional conductive material comprises metallic particles.

Embodiment 86. The secondary battery of Embodiment 81, wherein the additional conductive material and the conductive material are a same type of conductive material.

Embodiment 87. The secondary battery of any of Embodiments 80-86, wherein the additional conductive adhesive comprises a hot-melt adhesive polymer.

Embodiment 87.1. The secondary battery of any of Embodiments 80-86, wherein a melt flow index of the additional conductive adhesive determined according to ASTMD 1238 at 190° C. is between 0.1 to 1000 grams (g)/10 minutes (min).

Embodiment 87.2. The secondary battery of Embodiment 87.1, wherein the melt flow index is between 0.1 to 100 g/10 min.

Embodiment 87.3. The secondary battery of Embodiment 87.1, wherein the melt flow index is between 0.5 to 20 g/10 min.

Embodiment 87.4. The secondary battery of any of Embodiments 80-87.3, wherein a melting point of the additional conductive adhesive is between 40° C. and 300° C.

Embodiment 87.5. The secondary battery of Embodiment 87.4, wherein the melting point of the additional conductive adhesive is between 60° C. and 200° C.

Embodiment 87.6. The secondary battery of Embodiment 87.4, wherein the melting point of the additional conductive adhesive is between 70° C. and 165° C.

Embodiment 88. The secondary battery of any of Embodiments 80-87.6, wherein the additional conductive adhesive has a resistivity greater than or equal to 0.01 $\Omega \cdot cm$.

Embodiment 89. The secondary battery of any of Embodiments 80-88, wherein the additional conductive adhesive has a resistivity less than or equal to 1.0 $\Omega \cdot cm$.

Embodiment 90. The secondary battery of any of Embodiments 80-89, wherein the additional conductive adhesive comprises one of ethylene-co-acrylic acid, an ionomer of ethylene-co-acrylic acid, and a polymer of ethylene-co-acrylic acid.

Embodiment 91. The secondary battery of any of Embodiments 80-89, wherein the additional conductive adhesive comprises one of ethylene-co-methacrylic acid, an ionomer of ethylene-co-methacrylic acid, and a polymer of ethylene-co-methacrylic acid.

Embodiment 92. The secondary battery of any of Embodiments 80-89, wherein the additional conductive adhesive comprises a functionalized polyethylene.

Embodiment 93. The secondary battery of any of Embodiments 80-89, wherein the additional conductive adhesive comprises a functionalized polypropylene.

Embodiment 94. The secondary battery of any of Embodiments 76-79, wherein each member of the additional current limiter population comprises a conductive film.

Embodiment 95. The secondary battery of any of Embodiments 76-94, wherein each member of the additional current limiter population is physically located between the electrode bus bar and its associated electrode current collector.

Embodiment 96. The secondary battery of any of Embodiments 55-95, wherein the electrode assembly further comprises a population of additional electrode structures, each member of the population of additional electrode structures comprises the electrode active material and an additional electrode current collector, the additional electrode current collectors being electrically connected, in parallel, to the electrode busbar without being connected to a member of the current limiter population.

Embodiment 97. The secondary battery of any of Embodiments 55-96, wherein the electrode structures comprise cathode structures, the electrode active materials comprise cathode active materials, the electrode current collectors comprise cathode current collectors, and the electrode busbar comprises a cathode busbar.

Embodiment 98. The secondary battery of any of Embodiments 55-96, wherein the electrode structures comprise anode structures, the electrode active materials comprise anode active materials, the electrode current collectors comprise anode current collectors, and the electrode busbar comprises an anode busbar.

Embodiment 99. A method of testing an electrode unit cell with a current limiter for use in an electrode assembly for cycling between a charged state and a discharged state, the electrode unit cell comprising an electrode structure, a counter-electrode structure, and a spacer between the electrode structure and the counter-electrode structure, the current limiter electrically connected to the electrode structure, wherein the electrode unit cell has a capacity C and a voltage V. The method includes electrically connecting a current limiter to the electrode structure, wherein at a temperature of 25 degrees Celsius (° C.) the current limiter has a resistance greater than or equal to 0.25 ohms ($\Omega$). A conductive particle is inserted at a location of the electrode unit cell between the electrode structure and the counter-electrode structure and an indenter positioned above the location of the electrode unit cell at which the conductive particle was inserted. The indenter is pressed into the electrode unit cell at a speed of 1.0 millimeters (mm) per second while preventing the electrode unit cell from moving to push the conductive particle through the spacer and into contact with both the electrode unit cell and the counter-electrode unit cell. The electrode unit cell with the current limiter fails the test when the electrode unit cell catches on fire, and the electrode unit cell with the current limiter passes the test when the electrode unit cell does not catch on fire.

Embodiment 100. The method of Embodiment 99, wherein pressing the indenter into the electrode unit cell comprises pressing the indenter into the electrode unit cell until a voltage drop of more than eighty percent of the voltage V is observed.

Embodiment 101. The method of Embodiment 99 or Embodiment 100, wherein inserting the conductive particle comprises inserting a nickel particle.

Embodiment 102. The method of Embodiment 101, wherein inserting the nickel particle comprises inserting a nickel particle that is a 2.0 mm by 0.2 mm by 0.1 mm nickel particle shaped like the English letter "L."

Embodiment 103. The method of any of Embodiments 99-102, further comprising: attaching a different current limiter to a similar electrode unit cell having the same capacity C and the same voltage V as the electrode unit cell when the electrode unit cell has been determined to fail the test, the different current limiter having a larger resistance at a temperature of 25° C. than the current limiter, inserting a similar conductive particle at a location of the similar electrode unit cell between a similar electrode structure and a similar counter-electrode structure of the similar electrode unit cell, positioning the indenter above the location of the similar electrode unit cell at which the similar conductive particle was inserted, pressing the indenter into the similar electrode unit cell at a speed of 1.0 mm per second while preventing the similar electrode unit cell from moving, determining that the similar electrode unit cell with the different current limiter fails the test when the similar electrode unit cell catches on fire, and determining that the similar electrode unit cell with the different current limiter passes the test when the similar electrode unit cell does not catch on fire.

Embodiment 104. A method of designing an electrode assembly for cycling between a charged state and a discharged state includes assembling an electrode unit cell having a type, the electrode unit cell comprising an electrode structure, a counter-electrode structure, and a spacer between the electrode structure and the counter-electrode structure, the type being determined by a voltage produced by the electrode unit cell, a capacity of the electrode unit cell, and the materials used to construct the electrode structure, the counter-electrode structure, and the spacer. A current limiter is electrically connected to the electrode structure, wherein at a temperature of 25 degrees Celsius (° C.) the current limiter has a resistance greater than or equal to 0.25 ohms ($\Omega$). A conductive particle is inserted at a location of the electrode unit cell between the electrode structure and the counter-electrode structure. An indenter is positioned above the location of the electrode unit cell at which the conductive particle was inserted. The indenter is pressed into the electrode unit cell at a speed of 1.0 millimeters (mm) per second while preventing the electrode unit cell from moving to push the conductive particle through the spacer and into contact with both the electrode unit cell and the counter-electrode unit cell. The electrode unit cell with the current limiter fails the test when the electrode unit cell catches on fire and the electrode unit cell with the current limiter passes the test when the electrode unit cell does not catch on fire. An electrode structure including a population of electrode unit cells of the type and a population of the current limiters when the electrode unit cell with the current limiter passed the test is assembled, each current limiter being electrically connected to a different electrode unit cell.

Embodiment 105. The method of Embodiment 104, further comprising assembling a similar electrode unit cell having a same type as the electrode unit cell, electrically connecting a different current limiter to the similar electrode structure, wherein at a temperature of 25 degrees ° C. the different current limiter has a resistance greater than the current limiter, inserting a similar conductive particle at a location of the similar electrode unit cell, positioning the indenter above the location of the similar electrode unit cell at which the conductive particle was inserted, pressing the indenter into the similar electrode unit cell at a speed of 1.0 mm per second while preventing the similar electrode unit cell from moving, determining that the similar electrode unit cell with the different current limiter fails the test when the similar electrode unit cell catches on fire, determining that the similar electrode unit cell with the different current limiter passes the test when the similar electrode unit cell does not catch on fire, and assembling an electrode structure including a population of electrode unit cells having the same type as the electrode unit cell and a population of the different current limiters when the similar electrode unit cell with the different current limiter passed the test, each different current limiter being electrically connected to a different electrode unit cell.

Embodiment 106. A method of determining a thermal runaway current $I_{tr}$ through an electrode unit cell that may cause failure of an electrode assembly including a population of electrode unit cells if an internal short circuit occurs in one of the electrode unit cells, each electrode unit cell comprising an electrode structure, a counter-electrode structure, and a separator structure between the electrode structure and the counter-electrode structure. The method includes (a) in an electrode assembly of M unit cells electrically connected in parallel, inserting a conductive particle at a location of one electrode unit cell between the electrode structure and the counter-electrode structure, where M is a positive integer, (b) positioning an indenter above the electrode assembly at the location of the electrode unit cell at which the conductive particle was inserted, (c) pressing the indenter into the electrode assembly at a speed of 1.0 millimeters (mm) per second while preventing the electrode assembly from moving to push the conductive particle through the separator structure and into contact with both the electrode unit cell and the counter-electrode unit cell, (d) determining that the electrode assembly fails the test when the electrode assembly catches on fire, and determining that the electrode assembly passes the test when the electrode assembly does not catch on fire, (e) increasing M by one when the electrode assembly passes the test, and repeating steps (a) through (e), and proceeding to step (f) when the electrode assembly fails the test, and (f) determining the thermal runaway current $I_{tr}$ based on the electrode assembly including M−1 unit cells.

Embodiment 107. The method of Embodiment 106, wherein determining the thermal runaway current $I_{tr}$ based on the electrode assembly including M−1 unit cells comprises calculating the thermal runaway current $I_{tr}$ as a function of a voltage of an individual unit cell when fully charged, and a short circuit resistance of the electrode unit cell into which the conductive particle was inserted when the electrode assembly included M−1 unit cells.

Embodiment 108. A method of designing an electrode assembly including a population of electrode unit cells for cycling between a charged state and a discharged state includes: (a) assembling M electrode unit cells, each electrode unit cell comprising an electrode structure, a counter-electrode structure, and a separator structure between the electrode structure and the counter-electrode structure, where M is a positive integer, (b) electrically connecting M unit cells in parallel in an electrode assembly, (c) inserting a conductive particle at a location of one electrode unit cell between the electrode structure and the counter-electrode structure, (d) positioning an indenter above the electrode assembly at the location of the electrode unit cell at which the conductive particle was inserted, (e) pressing the indenter into the electrode assembly while preventing the electrode assembly from moving to push the conductive particle through the separator structure and into contact with both the electrode unit cell and the counter-electrode unit cell, (f) determining that the electrode assembly fails the test when the electrode assembly catches on fire, and determining that the electrode assembly passes the test when the electrode assembly does not catch on fire, (g) increasing M by one when the electrode assembly passes the test, and repeating steps (a) through (g), and proceeding to step (h) when the electrode assembly fails the test, (h) determining the thermal runaway current $I_{tr}$ based on the electrode assembly including M−1 unit cells, and (i) determining a resistance to be added in series with each electrode structure when a population of electrode unit cells are assembled into an electrode assembly that will limit a current through an individual electrode unit cell to less than the thermal runaway current $I_{tr}$ if a short circuit occurs in the individual electrode unit cell.

Embodiment 109. The method of Embodiment 108, wherein determining the thermal runaway current $I_{tr}$ based on the electrode assembly including M−1 unit cells comprises calculating the thermal runaway current $I_{tr}$ as a function of a voltage of an individual unit cell when fully charged, and a short circuit resistance of the electrode unit cell into which the conductive particle was inserted when the electrode assembly included M−1 unit cells.

Embodiment 110. The method of Embodiment 108 or 109 wherein the resistance to be added is a current limiting resistance $R_{cld}$ that satisfies $$\frac{V_{TOC}}{R_s + \left[R_{bl}^{-1} + \left(R_{cld} + R_t + \frac{R_{bl} + R_{cld}}{N-1}\right)^{-1}\right]^{-1}} < I_{tr}$$

where $V_{TOC}$ is a voltage of a unit cell when fully charged, $R_{bl}$ is a resistance of each unit cell, $R_s$ is a short circuit resistance of the electrode unit cell into which the conductive particle was inserted when the electrode assembly included M−1 unit cells, and N is a number of electrode unit cells to be included in the electrode assembly.

Embodiment 111. An electrode assembly for cycling between a charged state and a discharged state within a range of normal operating temperatures, the electrode assembly comprising a population of electrode structures, a population of counter-electrode structures, a population of current limiters, an electrode busbar, and a counter-electrode busbar. Each member of the electrode structure population comprises an electrode current collector, the electrode current collectors comprised by the electrode structure population members being electrically connected, in parallel, to the electrode busbar. Each member of the counter-electrode structure population comprises a counter-electrode current collector, the counter-electrode current collectors comprised by the counter-electrode structure population members being electrically connected, in parallel, to the counter-electrode busbar. Each of the electrode current collectors is electrically connected to the electrode busbar by a member of the population of current limiters, wherein each member of the current limiter population has a resistance when the electrode assembly is within the range of normal operating temperatures sufficient to limit a current through the electrode current collector to which it is attached to less than a current threshold $I_{tr}$.

Embodiment 112. An electrode assembly for cycling between a charged state and a discharged state within a range of normal operating temperatures, the electrode assembly comprising a population of electrode structures, a population of counter-electrode structures, a population of current limiters, an electrode busbar, and a counter-electrode busbar. Each member of the electrode structure population comprises an electrode current collector, the electrode current collectors comprised by the electrode structure population members being electrically connected, in parallel, to the electrode busbar. Each member of the counter-electrode structure population comprises a counter-electrode current collector, the counter-electrode current collectors comprised by the counter-electrode structure population members being electrically connected, in parallel, to the counter-electrode busbar. Each member of the population of current limiters comprises a conductive adhesive electrically connecting an electrode current collector to the electrode busbar, the conductive adhesive having a resistance greater than zero ohms (Ω) when the electrode assembly is within the range of normal operating temperatures.

Embodiment 113. An electrode assembly for cycling between a charged state and a discharged state within a range of normal operating temperatures, the electrode assembly comprising a population of electrode structures, a population of counter-electrode structures, a population of current limiters, an electrode busbar, and a counter-electrode busbar. Each member of the electrode structure population comprises an electrode current collector, the electrode current collectors comprised by the electrode structure population members being electrically connected, in parallel, to the electrode busbar. Each member of the counter-electrode structure population comprises a counter-electrode current collector, the counter-electrode current collectors comprised by the counter-electrode structure population members being electrically connected, in parallel, to the counter-electrode busbar. The population of current limiters comprises at least ten current limiters. Each of the electrode current collectors is electrically connected to the electrode busbar by a member of the population of current limiters, wherein each member of the current limiter population has a resistance greater than or equal to 0.25 ohms (Ω) when the electrode assembly is within the range of normal operating temperatures.

Embodiment 114. An electrode assembly for cycling between a charged state and a discharged state within a range of normal operating temperatures, the electrode assembly comprising a population of electrode structures, a population of counter-electrode structures, a population of separator structures for electrically isolating the electrode structure population and the counter-electrode structure population, a population of current limiters, an electrode busbar, and a counter-electrode busbar. Each member of the electrode structure population has a thermal runaway current $I_{tr}$ threshold. A voltage V exists between electrode structure population members and counter-electrode structure population members. The electrode busbar and the counter-electrode busbar collectively have a terminal resistance. The electrode structure population members each have an electrode structure resistance and comprise an electrode current collector, the electrode current collectors comprised by the electrode structure population members being electrically connected, in parallel, to the electrode busbar. Each member of the counter-electrode structure population comprises a counter-electrode current collector, the counter-electrode current collectors comprised by the counter-electrode structure population members being electrically connected, in parallel, to the counter-electrode busbar. Each member of the current limiter population is electrically connected between a different electrode current collector and the electrode bus bar, wherein when the electrode assembly is within the range of normal operating temperatures, each member of the current limiter population has a resistance that limits a current through its associated electrode structure population member to less than $I_{tr}$, and the resistance is determined within the range of normal operating temperatures as a function of V, a resistance of a short circuit between one electrode structure and one adjacent counter-electrode structure, the electrode structural resistance, the counter-electrode structural resistance, the terminal resistance, and a number of electrode structure population members connected to the electrode busbar.

Embodiment 115. The electrode assembly of any of Embodiments 1-54, further comprising at least one interface layer, the at least one interface layer being electrically connected between one or both of a) a member of the electrode current collectors and a member of the population of current limiters and b) a member of the population of current limiters and the electrode busbar.

Embodiment 116. The electrode assembly of Embodiment 115, wherein the interface layer comprises a conductive coating.

Embodiment 117. The electrode assembly of Embodiment 116, wherein the conductive coating comprises a coating of carbon nanotubes.

Embodiment 118. The electrode assembly of Embodiment 116, wherein the conductive coating comprises a carbon based coating.

Embodiment 119. The electrode assembly of any of Embodiments 116-118, wherein the conductive coating is coated on one or both of the member of the electrode current collectors and the electrode busbar.

Embodiment 120. The secondary battery of any of Embodiments 55-98, further comprising at least one interface layer, the at least one interface layer being electrically connected between one or both of a) a member of the electrode current collectors and a member of the population of current limiters and b) a member of the population of current limiters and the electrode busbar.

Embodiment 121. The secondary battery of Embodiment 120, wherein the interface layer comprises a conductive coating.

Embodiment 122. The secondary battery of Embodiment 121, wherein the conductive coating comprises a coating of carbon nanotubes.

Embodiment 123. The secondary battery of Embodiment 122, wherein the conductive coating comprises a carbon based coating.

Embodiment 124. The secondary battery of any of Embodiments 121-123, wherein the conductive coating is coated on one or both of the member of the electrode current collectors and the electrode busbar.

Embodiment 125. A method of assembling an electrode assembly comprising stacking a population of unit cells atop each other in a stacking direction, each member of the unit cell population including an electrode structure, a separator structure, and a counter-electrode structure, wherein the electrode structure comprises an electrode current collector and an electrode active material layer, the counter-electrode structure comprises a counter-electrode current collector and a counter-electrode active material layer, the electrode structure and the counter-electrode structure extend in a longitudinal direction perpendicular to the stacking direction, and an end portion of the electrode current collector extends past the electrode active material and the separator structure in the longitudinal direction; bending the end portion of each electrode current collector in a direction orthogonal to the longitudinal direction of the electrode structure and to extend in the stacking direction or opposite the stacking direction; positioning an electrode busbar extending in the stacking direction with a surface of the electrode busbar adjacent the end portions of the electrode current collectors; and applying heat and pressure to the electrode busbar to adhere the end portions of the electrode current collectors to the busbar through an adhesive layer comprising a resistive polymeric material.

Embodiment 126. The method of Embodiment 125, wherein the resistive polymeric layer comprises a thermoplastic material.

Embodiment 127. The method of Embodiment 125, wherein the adhesive layer is formed on the surface of the electrode busbar in contact with the end portion of the electrode current collectors.

Embodiment 128. The method of Embodiment 127, wherein the resistive polymeric material comprises an adhesive polymer, and the adhesive layer comprises a conductive material suspended in the adhesive polymer.

Embodiment 129. The method of Embodiment 128, wherein the conductive material comprises one or more of carbon black, nickel, copper, gold, silver, titanium, graphite, molybdenum, chromium, and aluminum.

Embodiment 130. The method of Embodiment 128, wherein the conductive material comprises metal coated carbon fibers.

Embodiment 131. The method of Embodiment 130, wherein the metal coated carbon fibers comprise nickel coated carbon fibers.

Embodiment 132. The method of Embodiment 130, wherein the metal coated carbon fibers have a length and a diameter and an aspect ratio of the length to the diameter of the metal coated carbon fibers is between 10:1 and 10,000:1 inclusive.

Embodiment 133. The method of Embodiment 132, wherein the aspect ratio is between 50:1 to 5,000:1 inclusive.

Embodiment 134. The method of Embodiment 132, wherein the aspect ratio is between 100:1 to 2,000:1 inclusive.

Embodiment 135. The method of Embodiment 128, wherein a melt flow index of the conductive adhesive determined according to ASTM D 1238 at 190° C. is between 0.1 to 1000 grams (g)/10 minutes (min).

Embodiment 136. The method of Embodiment 135, wherein the melt flow index is between 0.1 to 100 g/10 min.

Embodiment 137. The method of Embodiment 135, wherein the melt flow index is between 0.5 to 20 g/10 min.

Embodiment 138. The method of Embodiment 128, wherein a melting point of the conductive adhesive is between 40° C. and 300° C.

Embodiment 139. The method of Embodiment 138, wherein the melting point of the conductive adhesive is between 60° C. and 200° C.

Embodiment 140. The method of Embodiment 138, wherein the melting point of the conductive adhesive is between 70° C. and 165° C.

Embodiment 141. The method of Embodiment 125, wherein bending the end portion of each electrode current collector comprises positioning the electrode busbar against unbent end portions of each electrode current collector and applying pressure toward the electrode current collectors and in the stacking direction.

Embodiment 142. The method of Embodiment 125, wherein an end portion of each counter-electrode current collector extends past the counter-electrode active material and the separator structure in the longitudinal direction opposite of the end portions of the electrode current collectors, the method further comprising bending the end portion of each counter-electrode current collector to be approximately perpendicular to the longitudinal direction of the counter-electrode structure and to extend in the stacking direction or opposite the stacking direction; positioning a counter-electrode busbar extending in the stacking direction with a surface of the counter-electrode busbar in contact with the end portions of the counter electrode current collectors; and attaching the counter-electrode busbar to the end portions of the counter electrode current collectors.

Embodiment 143. The method of Embodiment 142, wherein attaching the counter-electrode busbar to the end portions of the counter electrode current collectors comprises gluing the counter-electrode busbar to the end portions of the counter-electrode current collectors.

Embodiment 144. The method of Embodiment 142, wherein attaching the counter-electrode busbar to the end portions of the counter electrode current collectors comprises attaching the counter-electrode busbar to the end portions of the counter-electrode current collectors by welding or soldering.

Embodiment 145. The method of Embodiment 142, wherein the surface of the counter-electrode busbar in contact with the end portions of the counter-electrode current collectors has a resistive polymeric layer disposed thereon, and attaching the counter-electrode busbar to the end portions of the counter electrode current collectors comprises applying heat and pressure to the counter-electrode busbar to adhere the end portions of the counter-electrode current collectors to the busbar through the resistive polymeric layer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrode assembly for cycling between a charged state and a discharged state within a range of normal operating temperatures between negative 30 degrees Celsius (° C.) and 80° C., the electrode assembly comprising:
    a population of unit cells stacked atop each other in a stacking direction, each member of the unit cell population includes an electrode structure, a separator structure, and a counter-electrode structure, wherein:
      the electrode structure comprises an electrode current collector and an electrode active material layer, the electrode structure extends in a longitudinal direction perpendicular to the stacking direction, an end portion of the electrode current collector extends past the electrode active material and the separator structure in the longitudinal direction, and the end portion of the electrode current collector comprises a bent portion that is bent in a direction orthogonal to the longitudinal direction of the electrode structure and extends in the stacking direction; and
      the counter-electrode structure comprises a counter-electrode current collector and a counter-electrode active material layer, the counter-electrode structure extends in a longitudinal direction perpendicular to the stacking direction;
    an electrode busbar extending in the stacking direction; and
    a population of current limiters disposed between the bent end portion of the population of unit cells and the electrode busbar, wherein:
      each member of the population of current limiters is disposed between the bent end portion of the electrode current collector of a different electrode structure and the electrode busbar to electrically connect the electrode structures to the electrode busbar;
      the bent end portion of the electrode current collector has an inner surface and an outer surface opposite the inner surface, the inner surface being closer to the electrode active material layer than the outer surface;
      the electrode busbar is positioned adjacent the outer surface of the bent end portion of the electrode current collector; and
      one or more current limiters of the population of current limiters are disposed between the outer surface of the bent end portion of the electrode current collector and the electrode busbar.

2. The electrode assembly of claim 1, wherein each member of the unit cell population has a cell resistance R1 and each member of the current limiter population has a resistance R2 such that R2/R1>0.01.

3. The electrode assembly of claim 1, wherein the population of current limiters comprises a conductive adhesive.

4. The electrode assembly of claim 3, wherein the conductive adhesive is comprised of a unitary conductive adhesive layer, and each member of the population of current limiters comprises a different portion of the unitary conductive adhesive layer.

5. The electrode assembly of claim 4, wherein the unitary conductive adhesive layer is disposed on the electrode busbar.

6. The electrode assembly of claim 4, wherein the conductive adhesive layer comprises an adhesive polymer and metal coated carbon fibers.

7. The electrode assembly of claim 6, wherein the metal coated carbon fibers comprise nickel coated carbon fibers.

8. The electrode assembly of claim 7, wherein the metal coated carbon fibers have a length and a diameter and an aspect ratio of the length to the diameter of the metal coated carbon fibers is between 10:1 and 10,000:1 inclusive.

9. The electrode assembly of claim 6, wherein a melt flow index of the adhesive polymer determined according to ASTMD 1238 at 190° C. is between 0.1 to 1000 grams (g)/10 minutes (min).

10. The electrode assembly of claim 9, wherein the melt flow index is between 0.1 to 100 g/10 min.

11. The electrode assembly of claim 9, wherein the melt flow index is between 0.5 to 20 g/10 min.

12. The electrode assembly of claim 6, wherein a melting point of the adhesive polymer is between 40° C. and 300° C.

13. The electrode assembly of claim 12, wherein the melting point of the adhesive polymer is between 60° C. and 200° C.

14. The electrode assembly of claim 12, wherein the melting point of the adhesive polymer is between 70° C. and 165° C.

15. The electrode assembly of claim 1, wherein the electrode structure comprises a negative electrode structure, and the counter-electrode structure comprises a positive electrode structure.

16. The electrode assembly of claim 1, wherein the electrode structure or the counter-electrode structure comprises an anodic electrode structure, the anodic electrode structure comprising graphite, silicon, or lithium metal.

17. The electrode assembly claim 1, wherein the electrode structure or the counter-electrode structure comprises a cathodic electrode structure, the cathodic electrode structure comprising lithium iron phosphate (LFP) or lithium nickel manganese cobalt oxide (NMC).

18. The electrode assembly claim 1, wherein the separator structure comprises a microporous separator material permeated with a liquid electrolyte.

19. The electrode assembly claim 1, wherein the separator structure comprises a solid-state lithium ion conducting ceramics.

20. A method of assembling an electrode assembly for cycling between a charged state and a discharged state within a range of normal operating temperatures between negative 30 degrees Celsius (° C.) and 80° C., the method comprising:
   stacking a population of unit cells atop each other in a stacking direction, each member of the unit cell population including an electrode structure, a separator structure, and a counter-electrode structure, wherein the electrode structure comprises an electrode current collector and an electrode active material layer, the counter-electrode structure comprises a counter-electrode current collector and a counter-electrode active material layer, the electrode structure and the counter-electrode structure extend in a longitudinal direction perpendicular to the stacking direction, and an end portion of the electrode current collector extends past the electrode active material and the separator structure in the longitudinal direction;
   bending the end portion of the electrode current collector in a direction orthogonal to the longitudinal direction of the electrode structure and to extend in the stacking direction or opposite the stacking direction;
   positioning an electrode busbar in the stacking direction such that a surface of the electrode busbar is located adjacent the bent end portion of the electrode current collector; and
   electrically connecting the bent end portion of the electrode current collector to the electrode busbar though one or more current limiters of the population of current limiters wherein:
      the bent end portion of the electrode current collector has an inner surface and an outer surface opposite the inner surface, the inner surface being closer to the electrode active material layer than the outer surface;
      the electrode busbar is positioned adjacent the outer surface of the bent end portion of the electrode current collector; and
      one or more current limiters of the population of current limiters are disposed between the outer surface of the bent end portion of the electrode current collector and the electrode busbar.

21. The method of claim 20, wherein the population of current limiters comprises a conductive adhesive, the conductive adhesive is comprised of a unitary conductive adhesive layer, and each member of the population of current limiters comprises a different portion of the unitary conductive adhesive layer.

22. The method of claim 21, wherein the unitary conductive adhesive layer is disposed on the electrode busbar.

23. The method of claim 22, wherein electrically connecting the bent end portions of the electrode current collectors to the electrode busbar though one or more current limiters of the population of current limiters comprises applying heat and pressure to the electrode busbar to soften the unitary conductive adhesive layer to adhere the bent end portion of the electrode current collector to the electrode busbar and thereby electrically connect, in parallel, the bent end portion to the electrode busbar.

24. The method of claim 21, wherein the conductive adhesive layer comprises an adhesive polymer and metal coated carbon fibers.

25. The method of claim 24, wherein the metal coated carbon fibers comprise nickel coated carbon fibers.

26. The method of claim 24, wherein the metal coated carbon fibers have a length and a diameter and an aspect ratio of the length to the diameter of the metal coated carbon fibers is between 10:1 and 10,000:1 inclusive.

27. The method of claim 24, wherein a melt flow index of the adhesive polymer determined according to ASTMD 1238 at 190° C. is between 0.1 to 1000 grams (g)/10 minutes (min).

28. The method of claim 24, wherein a melting point of the adhesive polymer is between 40° C. and 300° C.

29. The method of claim 20, wherein each member of the unit cell population has a cell resistance R1 and each member of the current limiter population has a resistance R2 such that R2/R1>0.01.

* * * * *

UNITED STATES PATENT AND TRADEMARK OFFICE
CERTIFICATE OF CORRECTION

PATENT NO. : 12,362,439 B2  
APPLICATION NO. : 18/316321  
DATED : July 15, 2025  
INVENTOR(S) : Armstrong et al.

Page 1 of 1

It is certified that error appears in the above-identified patent and that said Letters Patent is hereby corrected as shown below:

On the Title Page

Item (72), "Inventors", delete "New Braunfels, CA (US)", and insert --New Braunfels, TX (US)-- after "Michael J. Armstrong"

Signed and Sealed this  
Twelfth Day of August, 2025

Coke Morgan Stewart  
*Acting Director of the United States Patent and Trademark Office*